United States Patent
Diaz-Tellez et al.

(10) Patent No.: US 9,967,284 B2
(45) Date of Patent: *May 8, 2018

(54) PROCESSING DEVICE AND METHOD OF OPERATION THEREOF

(71) Applicant: BRITISH TELECOMMUNICATIONS PUBLIC LIMITED COMPANY, London (GB)

(72) Inventors: Yair Diaz-Tellez, London (GB); Fadi El-Moussa, London (GB); Theo Dimitrakos, London (GB); Abdullahi Arabo, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/758,663

(22) PCT Filed: Dec. 31, 2013

(86) PCT No.: PCT/GB2013/000568
§ 371 (c)(1),
(2) Date: Jun. 30, 2015

(87) PCT Pub. No.: WO2014/102523
PCT Pub. Date: Jul. 3, 2014

(65) Prior Publication Data
US 2015/0358356 A1  Dec. 10, 2015

(30) Foreign Application Priority Data

Dec. 31, 2012  (EP) .................................... 12250190
Aug. 22, 2013  (EP) .................................... 13250097

(51) Int. Cl.
*H04W 12/08* (2009.01)
*H04L 29/06* (2006.01)
(Continued)

(52) U.S. Cl.
CPC ............ *H04L 63/20* (2013.01); *G06F 21/629* (2013.01); *G06F 21/6218* (2013.01); *H04W 12/08* (2013.01); *H04W 88/02* (2013.01)

(58) Field of Classification Search
CPC .... G06F 21/6218; H04W 12/08; H04W 88/02
See application file for complete search history.

(56) References Cited

U.S. PATENT DOCUMENTS 9,436,820 B1 *   9/2016   Gleichauf ............... G06F 21/50
2004/0123150 A1  6/2004   Wright et al.
(Continued)

FOREIGN PATENT DOCUMENTS

EP   2 290 578   3/2011

OTHER PUBLICATIONS

International Search Report for PCT/GB2013/000568 dated Jul. 11, 2014, six pages.

*Primary Examiner* — Ellen Tran
(74) *Attorney, Agent, or Firm* — Nixon & Vanderhye P.C.

(57) ABSTRACT

A processing device (10) includes a policy evaluation module (131) for evaluating policies associated with an item of data or an application and a dynamic context determination module (133) for determining contextual information associated with the current context of operation of the device and for providing the thus determined contextual information to the policy evaluation module. The device (10) further includes a policy enforcement module (135) for enforcing the evaluation specified by the policy evaluation module (131), wherein the device is operable to cause the policy evaluation module to evaluate a policy associated with an (Continued)

item of data or an application whenever the associated item of data or application is invoked and, additionally, whilst the associated item of data or application is active on the device and a notification of a change in the determined contextual information is received by the policy evaluation module.

8 Claims, 9 Drawing Sheets

(51) Int. Cl.
    *G06F 21/62*     (2013.01)
    *H04W 88/02*     (2009.01)

(56) References Cited

U.S. PATENT DOCUMENTS

2005/0055578 A1*   3/2005   Wright .................... G06F 21/32
                                                                 726/4
2006/0120526 A1    6/2006   Boucher et al.

* cited by examiner

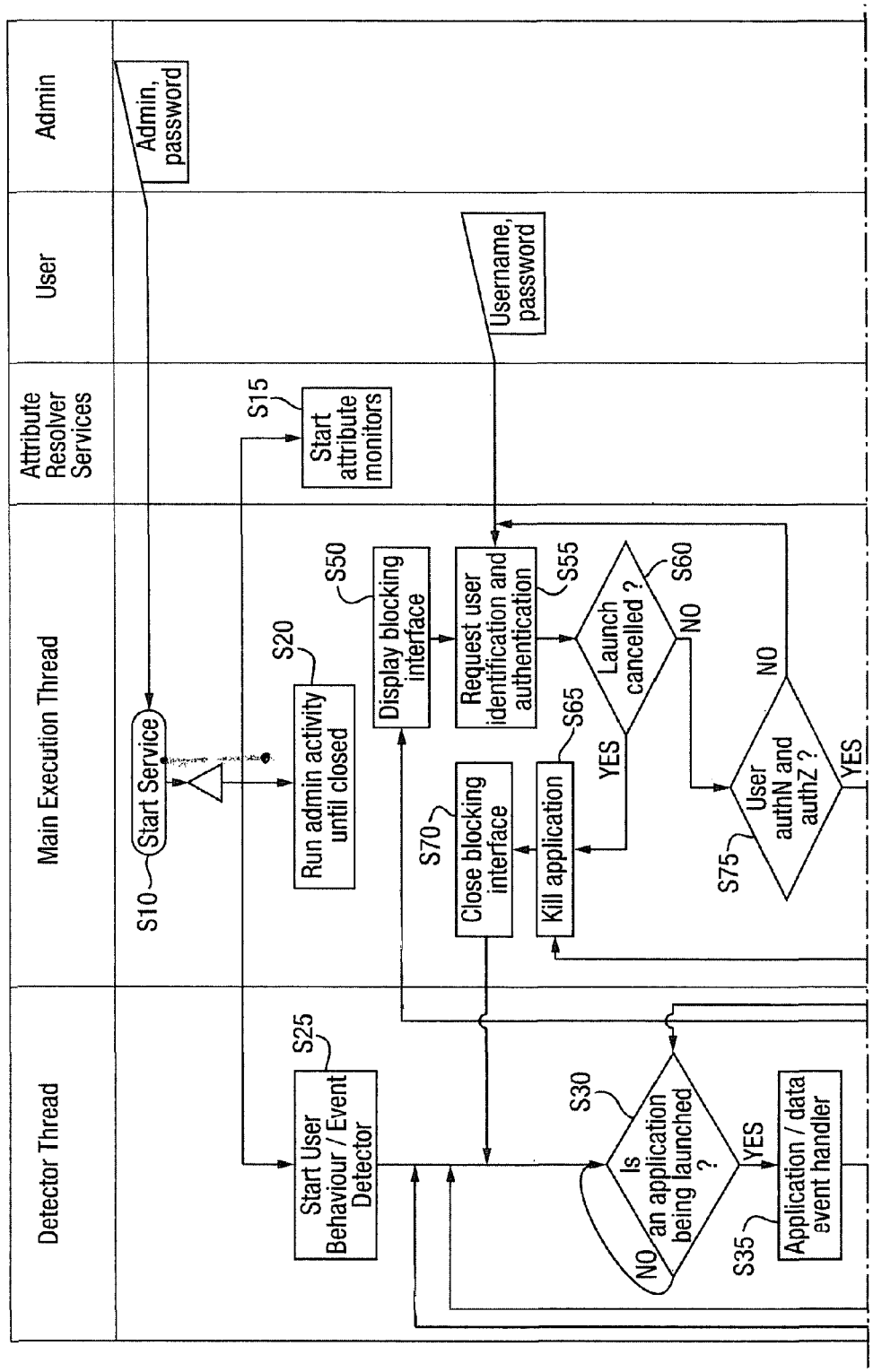

PROCESSING DEVICE AND METHOD OF OPERATION THEREOF

This application is the U.S. national phase of International Application No. PCT/GB2013/000568 filed 31 Dec. 2013 which designated the U.S. and claims priority to EP Application No. 12250190.1 filed 31 Dec. 2012 and EP Application No. 13250097.6 filed 22 Aug. 2013, the entire contents of each of which are hereby incorporated by reference.

FIELD OF INVENTION

The present invention relates to a processing device and a method of operation thereof and in particular to mobile computing or communications devices such as laptop computers, mobile telephones (especially "smart-phones"), Personal Digital Assistants (PDA's), tablet computer's etc. Such devices are becoming increasingly powerful (and the software which they are running is becoming correspondingly, increasingly complex) over time, and, in addition techniques and infrastructure are being developed and deployed which make it increasingly common for such devices to be able to host and access data and applications owned by different entities (e.g. corporate vs. personal vs. third parties) under different security contexts, for example: an application hosted on a mobile device accessing data from within a secure private network (e.g. a corporate network or Intranet) even whilst the device is connected only to an unsecure external network such as the Internet from home.

There is therefore a need to provide security measures for use with such devices to ensure that any hosted data and applications are accessed and used in secure manner: Data must be handled securely, especially to prevent devices from having confidential data accessed by unauthorised third parties either maliciously or inadvertently. Such unauthorised access could result from malware operating on the device in question, or from user actions performed on the device either as a result of some sort of malware (e.g. some sort of social engineering security attack) or simply by the user making a mistake or inadvertently performing an unwise action. In the present application, two types of hosted applications that require security measures to be applied are considered: protected applications and restricted applications. Protected applications are applications whose owner enforces a security policy on how such applications may be used; for example, a corporate application that can be used only during office hours. Restricted applications are applications whose functionality or use may be restricted on a device depending on the action(s) this restricted application intends to perform; for example, a third party application such as Facebook may be restricted at the location "office" in order to prevent any employee from leaking corporate protected data inadvertently (this is an identified and common example of data leakage in organizations). The present invention lies within this field of securing data and applications accessed by computing or communication devices, especially mobile ones.

DESCRIPTION OF RELATED ART

US 2004/0123150 describes a method of securing data stored on mobile devices by enabling policies specifying the circumstances under which data stored on, the device may be accessed. The policies may take into account contextual information about the mobile device such as the current location of the device, whether the device has an anti-malware program running and/or the type of network connection being used by the device. US 2004/0123150 does not consider securing applications per se in any particular way.

US 2006/120526 and EP 2 290 578 also describe methods of securing data on mobile devices based on the use of security policies and contextual information associated with a mobile user device. However neither document addresses the question of when the evaluation of a security policy should be performed. Moreover, both documents seem to rely heavily on the use of a single security server controlling the security policies. EP 2 290 578 seems to describe updating a security policy contained on a security server in the event that it is notified of a change of context of a user device and then modifying all security policies possibly effected by the change as a consequence of the update, however it does not seem to disclose the circumstance under which a particular thus modified security policy should be applied to a particular "business intelligence report". Similarly, US 2006/120526 does not provide any teaching as to when security policies should be evaluated, it being implicitly assumed perhaps that security policies should be evaluated at the time when a request for a particular action to be performed is requested so as to decide whether or not that action should be permitted, but even this is not explicitly taught in US 2006/120526.

The paper "MOSES: Supporting Operation Modes on Smartphones" by Russello, Conti, Crispo and Fernandes describes a method of securing, for example, work data files by providing separate security profiles (e.g. a work profile and a home profile) and setting different security policies to be applied in the different security profiles. When in, say, a work profile, only files (including both applications and data files) which have been associated with the work security profile (using a special sort of association called tainting) can be accessed from the phone and the security policies associated with the security profile are applied. The phone can be in only one security profile at a time and so a user must switch from say a work mode to a home mode in order to access personal functions. The paper explains how switching between different profiles can be automated to some degree based on contextual info obtained by the phone and rules specifying when to switch from one profile to another.

In a separate field of technology, relating to the safekeeping of user data (such as patient medical records), an article entitled "Sticky Policies: An Approach for Managing Privacy across Multiple Parties" describes the use of "sticky policies" which are machine-readable policies which are strongly associated with, and travel together with, items of data as those items of data are transmitted between different devices. Techniques such as encryption can ensure that the data can only be accessed if the terms specified in the associated sticky policy are met by the party/device desiring to access the data. In this article the sort of conditions specified in the policy include the identity of parties permitted to access the data and the duration for which the data is accessible by specified parties. It also suggests that a policy could specify "use of the data only within a given set of platforms with certain security characteristics, a given network, or a sub-set of the enterprise" but no further details are given as to what this means, let alone how to implement such a condition. It is assumed that the intention is that the user could name certain platforms (e.g. NHS platforms) which are permitted to access the data because the user knows that such platforms have an adequate level of security of the data, whilst excluding certain other platforms (e.g.

pharmaceutical companies) which are known (or believed) to hold third party's data less securely.

SUMMARY OF THE INVENTION

According to a first aspect of the present invention, there is provided a processing device (especially a portable or mobile one such as a "smartphone" or a laptop computer) comprising a policy evaluation module for evaluating policies associated with an item of data or an application (so-called "sticky policies") and a dynamic context determination module for determining contextual information associated with the current context of operation of the device and for providing the thus determined contextual information to the policy evaluation module, the device further including a policy enforcement module for enforcing the actions (including the prevention of actions) specified by the policy evaluation module based upon an evaluation of a policy or policies by the policy evaluation module, wherein the device is operable to cause the policy evaluation module to evaluate a policy associated with an item of data or an application whenever the associated item of data or application is invoked and, additionally, whilst the associated item of data or application is active on the device and a notification of a change in the determined contextual information is received by the policy evaluation module.

Several advantages arise from such an arrangement. By having a dynamic context determination module, any change in the context which would cause a policy evaluation to be changed can be acted upon by the device in order to stop an activity that was previously safe (under an old context) but has now become unsafe. For example, if the device was displaying a document associated with a sticky policy which specifies that it can only be displayed if the user is at a "work" or "home" location, whilst the user was at work, if the dynamic context determination module determines that the device has left its work context, it may send a notification to the policy evaluation module which may then perform a re-evaluation of the sticky policy associated with the document (which is "active" since the device is displaying it to the user) and conclude that display (and possibly indeed storage of the document in a non-encrypted form) is now prohibited and the policy enforcement module may therefore cause the document to be closed (and possibly also cause the unencrypted file containing the document to be deleted such that only an encrypted version of the document remains in storage on the device).

Moreover, this approach provides great flexibility as to when a policy should be evaluated in order to be able to apply security policies to a large number of situations, whilst avoiding requiring that the policy evaluation needs to be performed on a continuous basis. This approach is thus very well suited to typical modern mobile devices which are used to working on a message based approach where applications register with other message generating notifications to receive notifications in which they are interested, etc. Additionally, the approach enables security policy functionality to be added to a standard mobile device in a straightforward manner as just another application which can run on the mobile device, etc. rather than having to be deeply incorporated into the underlying operating system of such a device, thus enabling a simple modification to an existing mobile device to install such functionality by simply installing an additional security policy evaluating (and encryption/decryption) application (or app) as will become apparent from descriptions of the preferred embodiments below.

Preferably, the policy evaluation module selects based on the active item or items of data and/or the active application or applications, and its or their associated policies, which events it is to be notified of by the dynamic context evaluation module, and the dynamic context evaluation module then only notifies the policy evaluation module of such requested events and does not notify the policy evaluation module of events for which it has not been requested to send notifications. Each time an item of data or an application becomes active or ceases to be active, the policy evaluation module may inform the dynamic context evaluation of any resulting changes to the events, of which it wishes to be notified.

Furthermore, it is advantageous if sticky policies are device agnostic and can be written in terms which are somewhat generic and tailored to policy writing. Thus a sticky policy might specify simply that a particular document may only be accessed "at work". The concept "at work" will naturally vary from device to device and determining that a device is at work may require a relatively complex evaluation of relatively low level contextual factors such as the IP address assigned to the device, whether the device can access certain network locations (e.g. associated with an intranet Uniform Resource Locator), the time of day or the date, the Service Set Identification (SSID) of any "visible" wireless access points, etc. This complex evaluation of low level factors may be performed by the dynamic context determination module and the outcome of the evaluation may then be reported to the policy evaluation module in terms used within sticky policies which the policy evaluation module then needs to evaluate—this can make the evaluation of a sticky policy or policies relatively straightforward for the policy evaluation module. Alternatively, the context determination module may simply report the low level context factors to the policy evaluation module, which may then perform the evaluation of low level factors itself. In both cases, the conversion between low-level factors and high level parameter values or concepts such as may be specified in sticky policies is preferably performed on the basis of context evaluation policies which may be independent of any sticky policies associated with data files or application files.

The sticky policies associated with data files or applications may specify low level details (or specify some low level details as part of a custom definition of a high level concept such as at work) where some particular requirements for these are known and pertinent to a particular data file or application, but it preferably should not be required to do so as the dynamic context determination module (or the policy evaluation module) is preferably able to provide the high level concept values itself if necessary based on settings or policies stored on the device (which settings may take initial default values—or which policies may be initial default policies—and may preferably be editable by a user or system administrator of the device—but most preferably only an authorised system administrator of a corporation where the device is a corporate device).

Preferably the device is a personal device in the sense that it is associated with a single main user (or is associated with one of a plurality of users, at any given moment in time, where the device is shared between a number of different users or is transferred from one user to another etc. as with certain operating systems which maintain different profiles for different users and allow a user to "log-in" to their profile when starting or accessing the device) and may be used in different contexts (e.g. in a work context and in a non-work or personal context) and wherein it is desirable to alter the functionality of the device (especially as regards the ability of the device to access certain data files) between the different contexts (in much the same way that some operating systems alter the functionality of a device, especially as regards the ability of the device to access certain data files, between different user profiles such that data files accessible to one user (when logged into their user profile) are not necessarily accessible to another user (when logged into that other user's profile).

To maximise the control over the device (for maximum security of data handled by the device), it is preferable if the policy enforcement module acts as an intermediate layer on top of the operating system of the device (and thus between the operating system and all other applications including, importantly, the user interface) such that all requests to the operating system are proxied by the policy enforcement module (i.e. all requests such as to invoke an application or to invoke the opening of a document by an application such as a text editor or document reader application are passed to the policy enforcement module which determines whether or not to permit the request, and if it is permitted to then make the request to the operating system to perform the requested action such as opening a specified document). However, as an alternative implementation, it is possible to implement the enforcement module as a separate application which merely listens to all specified requests (e.g. from the user interface or from an application) and then can issue high priority commands to over-ride requests from an application or the user interface which are determined to be not allowed as a result of a policy evaluation.

Most preferably, the sticky policies are applied to both data items (e.g. content files such as word processor documents, text files, pictures, presentation files, etc.) and to protected and restricted applications (e.g. executable files such as word processing applications, presentation applications, picture viewers, directory and file viewers, etc.). In general, policies are preferably written for and applied to (and thus associated with) entities which may include, for example, pure software entities such as data files, or executable program files such as applications, or to hardware entities such as devices or to entities such as individual people or companies, corporations, countries, etc. In addition policies may be associated with groups or classes of entities. This enables relatively fine grained and sophisticated control to be exerted over data and application items and their interaction with other entities in general without requiring excessively lengthy individual policies to have to be written. It also operates very effectively in a typical mobile device environment in which the device is being frequently moved between different contexts and in which data and applications can move relatively freely between different devices and between devices and a general "cloud" of processing and memory resources which are easily accessible from a typical mobile device most of the time. A dynamic context determination module synergistically combines with such sticky policies by being able to interpret policies associated with a device user and a device itself in order to provide an interface between different types of policies (e.g. those associated with applications and data and those associated with individuals and devices) to enable policies for data and applications to be written in relatively simple and generic device (and user) agnostic manners, whilst device and user related policies can be written in relatively simple, and generic, application (and data) agnostic manners. Also, it allows for the detection and/or prevention of suspiciously harmful or possibly harmful and unauthorised applications from running on devices (e.g. an unknown application without a correct sticky policy or no policy at all could be detected and stopped or prevented from starting).

Most preferably, the device employs an operating system intended for use with mobile devices such as the Android operating system developed by Google Inc. Within such an operating system, when a new application is launched from (in response to a user input) or by a currently running application (autonomously by the application and not in response to a user request), a record is kept of the stack of applications from or by which a further application or applications have been launched. Such a feature of the operating system can then be advantageously used to enable policies to exert greater control over the use of secure data on the device. For example, a policy can specify that certain data can only be accessed by a particular application if it is not running in combination with any other applications, or if it has not been launched by any other applications, or only if no other applications have been launched by it, etc.

According to a second aspect of the present invention, there is provided a method of providing secure access to data files using a personal processing device (preferably in accordance with the first aspect of the present invention), wherein the personal processing device includes a policy evaluation module, a dynamic context determination module and a policy enforcement module and is operable to run one or more applications which are capable of opening data files to permit a user of the device to view and/or otherwise interact with the contents of the data files, the method comprising the steps of associating a policy to a data file, transmitting the data file together with its associated policy to the personal processing device, at the device, in response to a request for an application to open the data file, determining the current context of the device and providing this to the policy evaluation module, evaluating the associated policy in dependence upon the received current context of the device, and the application opening the data file only in the event that the evaluation indicates that the application may open the data file.

The term personal processing device is used here to refer to a device which is associated with a particular user (or a group of particular users (e.g. a primary user and his/her family), although most commonly it will be primarily associated with just one single user) and which is used in different contexts (such as for example within a work context and a non-work context).

Preferably the method further comprises associating a policy to an application, transmitting the application and its associated policy to the personal processing device and evaluating the policy associated with the data file together with the policy associated with the application and the context information, in response to a request from the user for the application to open the data file.

According to a third aspect of the present invention, there is provided a method of operating a processing device which includes a policy evaluation module, a dynamic context determination module and a policy enforcement module and which is operable to run an application which is capable of opening a data file to permit a user of the device to view the contents of the data file, the method comprising receiving at the processing device a data file together with an associated policy which is associated with the data file, determining a current context of operation of the processing device, evaluating the received associated policy in dependence upon the determined current context of the device and causing the application to open the data file or to not open the data file in dependence upon the evaluation.

Preferably the method comprises receiving a plurality of data files each having a different respective associated policy which is evaluated in response to a request for its respective data file to be opened by the application. Furthermore, it is preferred if the device receives an application together with an associated application policy and both the respective data file policy associated with the data file and the respective application policy associated with the application are evaluated in response to a request from a user for the received application to open the data file associated with the evaluated data file policy. Most preferably the device receives a plurality of applications each of which is received together with an associated application policy, and evaluations are performed based on the respective application policy associated with the application specified in the or each user request for an application to open a data file. Most preferably the device receives an application in the form of an executable application file (by which is meant a file which can be readily installed onto the device without requiring user controlled compilation of source code, etc.—examples of the type of file intended to be included within the term executable application file are .exe files for use on Windows devices, .apk files for use on Android devices and .ipa files for use on IOS devices, etc.) which is then "installed" on the device (in a conventional manner—i.e. using whatever standard mechanism the device's operating system uses to install such applications, which may be almost nothing at all as per a standard Windows operating system such as Windows 7, etc.).

Further aspects of the present invention relate to processor implementable instructions for carrying out the method of operating a processing device according to the third aspect of the present invention and to a carrier medium, most preferably a non-transient carrier medium such as an optical or magnetic storage disk or a solid state memory device, carrying processor implementable instructions for carrying out a method of operating a processing device according to the present invention.

BRIEF DESCRIPTION OF THE DRAWINGS

In order that the present invention may be better understood, embodiments thereof will now be described, by way of example only, with reference to the accompanying drawings in which.

DETAILED DESCRIPTION OF EMBODIMENTS

Figure 1:
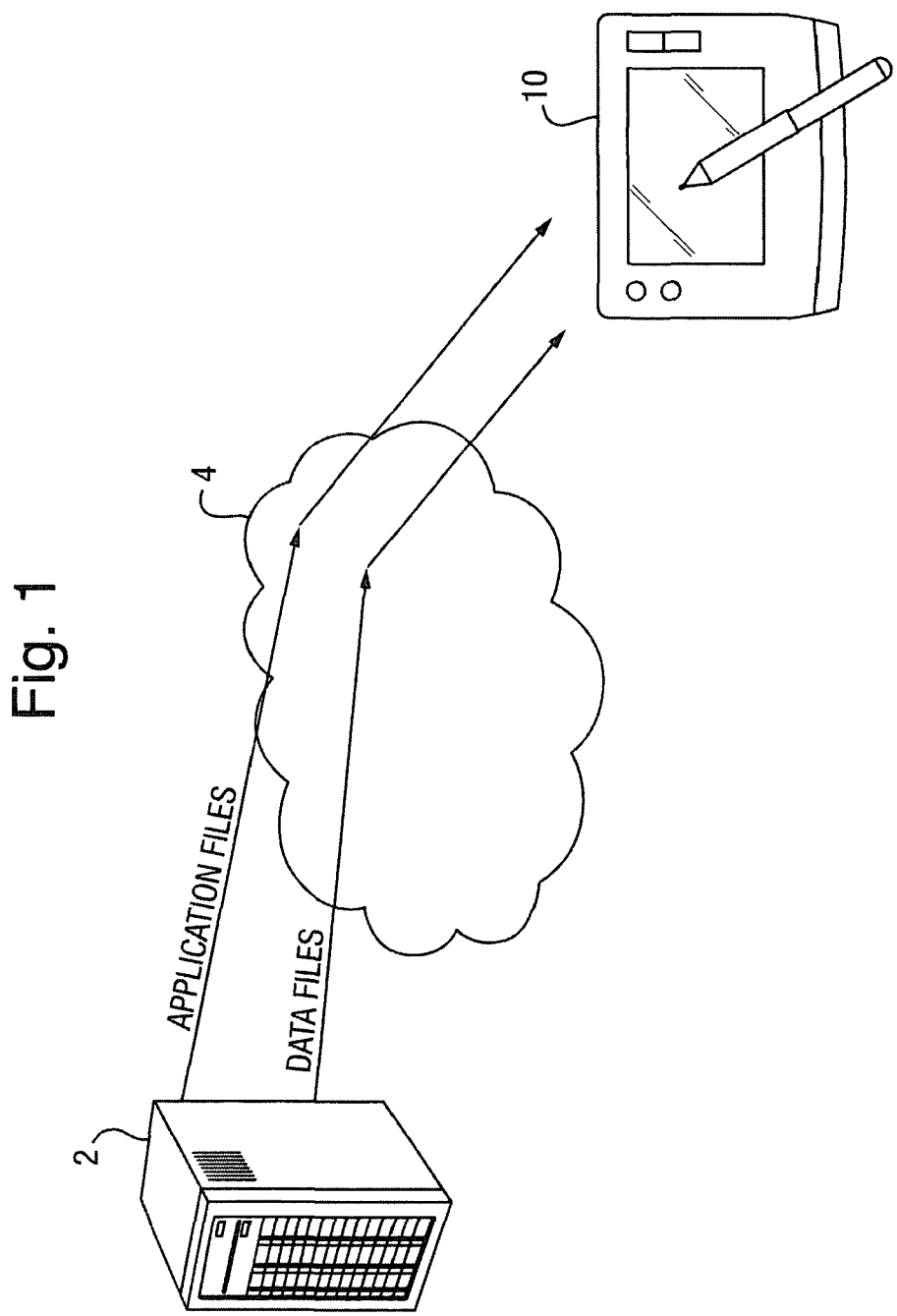
FIG. 1 is a schematic overview of a mobile device according to an embodiment of the present invention receiving application and data files from a corporate server via an unsecure network.

FIG. 1 gives a schematic overview of the general context of a first embodiment of the present invention. As shown, a corporate server 2 is in communication with a mobile device 10 over an unsecure network 2 such as the Internet. By means of this communication, the mobile device is able to download from the server 2 application files and data files (possibly as well as other kinds of files such as html files which may include a combination of data aspects and executable aspects, etc.—in addition the connection may permit other functions such as permitting voice and/or video calls to be made to the device from within a corporate intranet, etc.). In the present embodiment, controls are placed over the way in which such downloaded data and application files may be used by the device or the user of the device in order to enable security policies, specified by the corporation to which at least the server 2 belongs, to be adhered to.

Purely as an example, the sort of things that a policy might specify could include that a particular data file is only to be accessed by a particular type of application (e.g. one which is able to authenticate a user), or by a particular type of user (e.g. one authorised to access documents categorised as having a certain security level rating) or when the device is connected via a particular kind of network connection (e.g. using a wired Ethernet connection to a corporate Local Access Network, or using a wireless connection only if at work or at home, etc.) or only if certain other applications, services, protocols, etc. are (or aren't) running (e.g. only if an anti-malware application is operating and reporting that the device appears to be free of malware, etc.).

Figure 2:
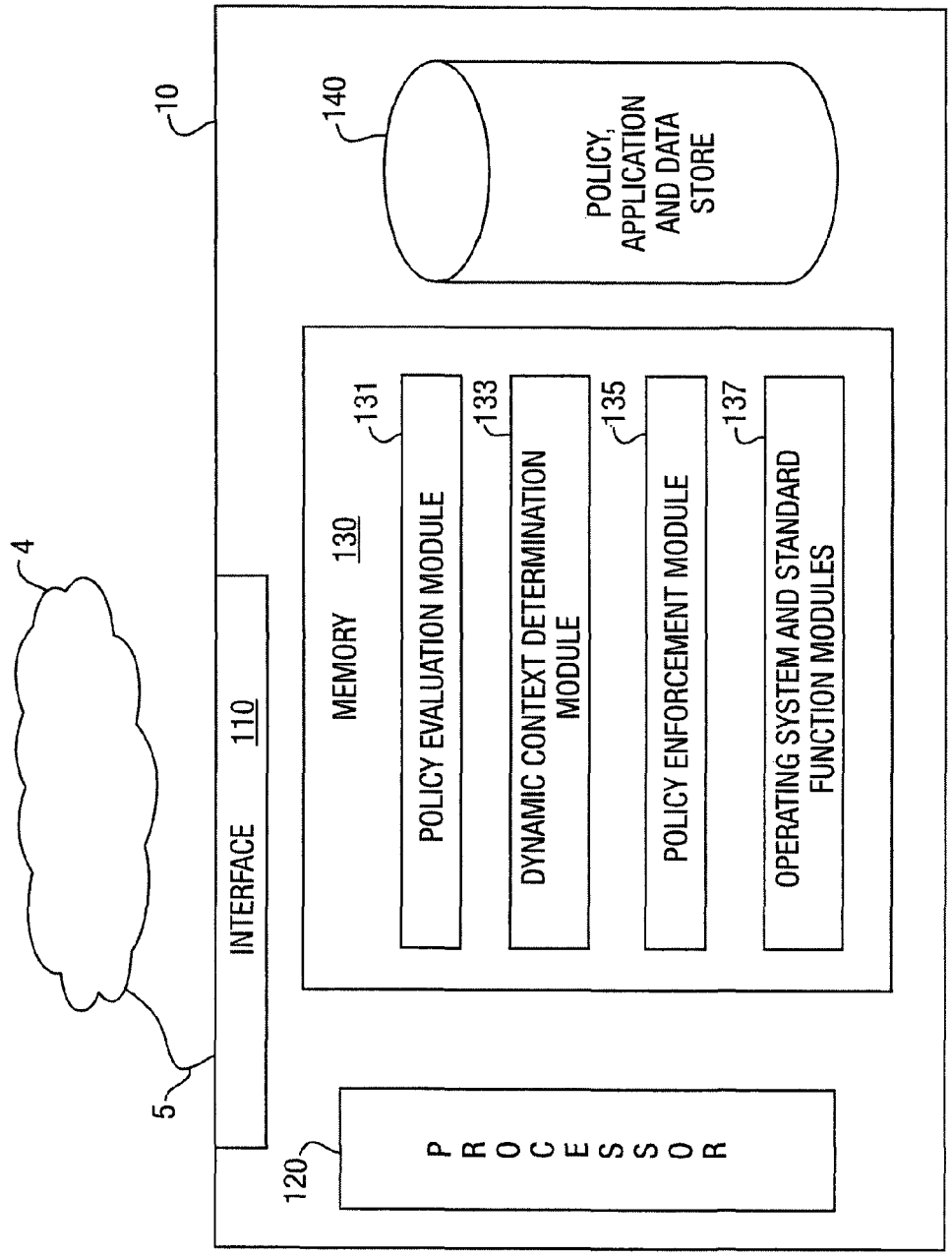
FIG. 2 is a schematic block diagram of the mobile device of FIG. 1 illustrating certain functional aspects of the device in greater detail.

FIG. 2 illustrates in overview the principal functionality of the mobile device 10. As shown, it comprises an interface 110 (which in the present embodiment includes a network interface for permitting wired and/or wireless communications 5 to the corporate server 2 via a (secure or unsecure) network (e.g. unsecure network 4) as well as a user interface such as a display and a keyboard—or perhaps just a touch sensitive display which also permits user entry by pressing soft keys displayed on the touch sensitive screen itself and most likely also a speaker or speakers and a microphone, etc.). Additionally, the device includes a processor unit 120 such as a digital microprocessor and associated circuitry as is common in portable devices such as personal digital assistants, smartphones, laptop computers, etc. The device additionally includes a memory 130 and a data store 140.

As will be well understood by a person skilled in the art, the memory 130 stores, when in use and powered on and booted up, a large amount of data including, for example, various software modules for permitting the device to operate (e.g. an operating system and various software modules providing conventional mobile device functionality, etc.). Some of these will be discussed in greater detail for the present particular embodiment employing the Android Operating system developed by Google Inc. Similarly, the data store (which may for example be a solid state memory device formed from non-volatile "Flash" Memory modules—i.e. a Solid State Drive (SSD)") stores a large amount of data required for general operation of the device, including, in the present embodiment for example, copies of the software modules which are loaded into memory at boot-up time of the device. However, FIG. 2 primarily illustrates the relatively small portions of the data contained in these two components (the memory 130 and the store 140) which are particularly pertinent to the present invention and these are discussed in greater detail below.

Thus, as shown in FIG. 2, the memory 130 includes a policy evaluation module 131 (module here (and below with reference to FIG. 2) refers to code or processor implementable instructions (and/or associated data) stored in the memory which when implemented/executed/invoked by the processor cause the functionality associated with this module and discussed below to be provided) which is operable to process one or more policies each time a policy evaluation trigger event occurs. Examples of such triggers are any request for a data file to be accessed or for an application to be invoked and any context change notifications (see below). Policy evaluation includes accessing the relevant policies (typically these will be sticky policies associated with any relevant application or data associated with the trigger event—note that exactly what constitutes relevant applications and relevant data is discussed below).

Additionally, the memory 130 includes a dynamic context determination module 133 which is operable to continuously and dynamically assess the context within which the device is currently operating and to notify the policy evaluation module by means of a context change notification if it detects that a (relevant) context change has occurred. Examples of aspects/phenomena which form part of the overall context of the device include the device's location, the type of connection which it is using to communicate with external devices, the mix of applications and data actively being run or used in some way on the device, a historical record of user and device interaction events and/or application and operating system interaction events, external devices or accessories connected to the device, and the manner in which they are so connected, and any messages or notifications received from external devices, etc. In the present embodiment, the policy evaluation module is operable to request information about the current values of one or more context parameters determined by the dynamic context determination module 133 and to also request to be notified in respect of a change to any specified context parameter (e.g. by registering as a listener for notifications concerning the specified parameters). In this way, the dynamic context determination module 133 only needs to send a context change notification if it has detected a context change which is relevant to the policy evaluation module (the relevance of the change having been predetermined by the policy evaluation unit and used to specify what context parameter changes it wants to be notified about).

Additionally, the memory 130 includes a policy enforcement module 135. This is operational to enforce any evaluations/decisions made by the policy evaluation module. For example, if the policy evaluation module determines that a piece of data being accessed by a reader application and currently being displayed on the device's display (or at least being capable of such display if it is currently being obscured by a different "window" which currently has the "focus" in preference to the reader application in which the piece of data in question is currently "open") to a user of the device, should no longer be made available for such display, the policy enforcement module 135 is operable to "close" the file being displayed and ensure that any non-encrypted copies of the data are deleted from the device.

Finally, the memory 130 additionally contains the operating system and standard function modules 137. Some of these are discussed in a little more depth below with reference to FIGS. 3 and 4.

Turning now to the data store 140, in addition to the copies of the various programs that are loaded into memory by the device at boot-up time in the conventional manner, the data store also stores a set of applications and data files each of which has an associated policy (which is also stored in the data store 140). In the present embodiment, some of the data files (and possibly also some of the application files) are stored in the data store in an encrypted manner. For encrypted files a key is required in order to decrypt and use the files and a mechanism is preferably provided to restrict access to this key to only authorised persons. In the present embodiment, this is achieved by having the corporate server 2 provide to the device the relevant key which has itself been encrypted using a public key associated with the device (such that only the device can decrypt this key by using its own private key), upon the device asserting that the policy evaluation module has evaluated that it is permitted to access the respective data file. However, any similarly (or more) secure approach would be acceptable involving, for example, a Trusted Platform Module (TPM), or solutions involving the security features of current or future Subscriber Identity Module (SIM) cards, etc. Alternatively, a simpler security mechanism could be adopted such as requiring a user to authenticate him or herself with the corporate server 2 before permitting the key to be provided to the device, etc. Preferably the key is a one time key that can only be used to decrypt the particular copy of the encrypted data (or application) file as stored on the device. Additional considerations will be well known to persons skilled in the art of encryption techniques and should be taken into account when developing particular embodiments having particular hardware and security needs.

In the present embodiment, all encryption functionality is performed within the policy enforcement module 135 which can itself be contained within a secure tamper resistant module such as a TPM. Again though it should be noted that several considerations concerned with the balance between usability of the device, security requirements and hardware and software constraints need to be balanced in particular embodiments depending upon the specific requirements of the device.

Figure 3:
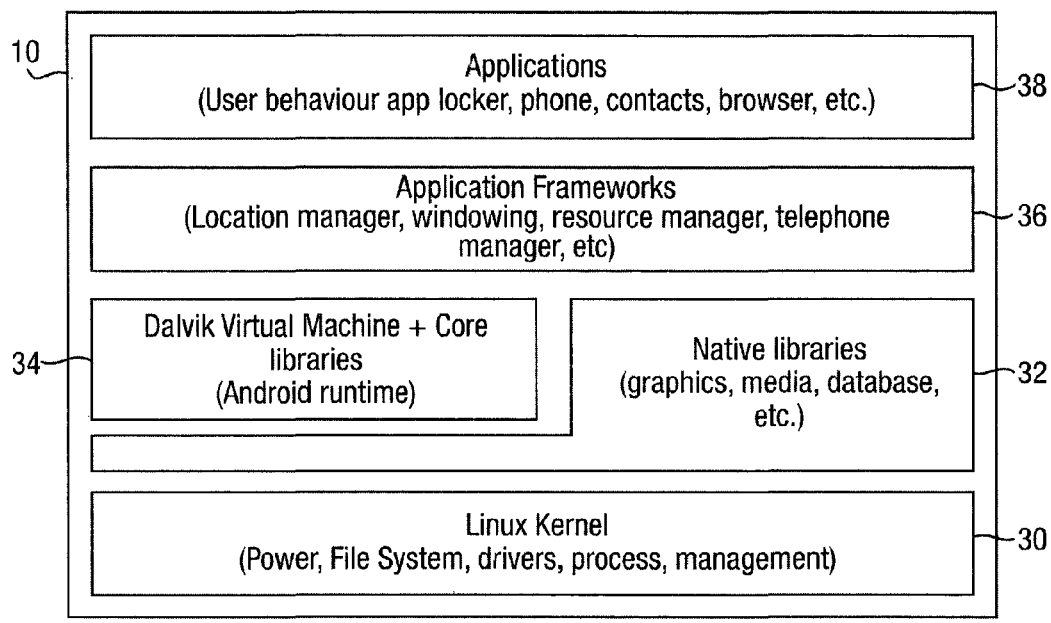
FIG. 3 is a schematic block diagram the mobile device of FIG. 1 illustrating its Android Operating system based software architecture.

Turning now to FIG. 3, a schematic illustration is given of the device 10 from a software architecture perspective. As with a typical Android architecture, the device uses a (modified) Linux kernel 30 as a hardware abstraction layer for the management of memory, resources, processes, network stack, security, etc.

Again, as in a typical Android-running portable device, the device 10 includes native libraries 32 which are compiled and preinstalled by the vendor (e.g. the device manufacturer) according to specific hardware abstractions required for the particular device which might for example be a smartphone or a tablet. The native libraries 32 include, in the present embodiment, media codecs, graphics, databases, a surface manager, and others.

Applications do not make calls directly to the Linux kernel, but instead they use the (android virtual machine) "Dalvik" which sits on top of the Linux kernel. The android runtime environment consists of the Dalvik Virtual Machine (DVM) and a set of core java libraries 34. Dalvik is a Java Virtual Machine (JVM) optimized for low memory usage and allows multiple Virtual Machine (VM) instances to be run at the same time as separate "users" (see below).

The application frameworks layer 36 provides the high level building blocks to create powerful applications. As is well understood in the art, the application frameworks layer includes programs such as: an activity manager, content providers, a location manager, a resource manager, a notification manager, a telephone manager etc.

The top layer is the applications layer 38 and consists of all installed end-user applications, e.g. phone, contacts, web browser and, in the present embodiment "Mobile Security Agent", etc. Note that the Mobile Security Agent is an application which in the present embodiment provides a policy evaluation module, a dynamic context determination module and a policy enforcement module.

Figure 4:
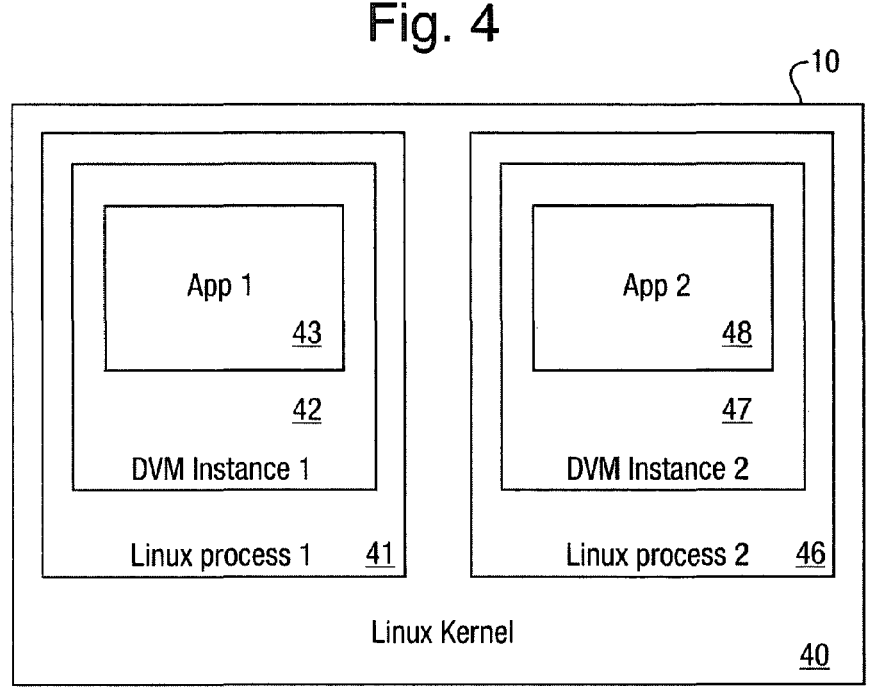
FIG. 4 is a schematic block diagram of the mobile device of FIG. 1 illustrating the approach adopted by the Android Operating system when allowing applications to run whereby they are "sandboxed" by having them run as separate "users" with their own process and their own instance of a java virtual machine.

FIG. 4 illustrates how in the device 10, since it is running the Android operating system, each application when it is invoked and starts running in Android can be thought of as "living" in its own security sandbox. The Android architecture features a multi-user Linux system in which each application is treated (by default) as though it is a different user (or as though it is running on behalf of a different user). By default, this is achieved by the system assigning to each application a unique Linux User ID (UID). When an application, e.g. application 43, 48, is launched it runs in its own instance of a DVM, e.g. "DVM Instance 1" 42 and "DVM Instance 2" 47, and each DVM 42, 47 runs in its own Linux process 41, 46 with its own UID respectively. All of these instances can be thought of finally as running on the Linux kernel (and associated additional Android specific modules) 40 which provides the lowest level interface to the hardware of the device 10, since the DVM instances run as separate Linux processes; to do this they use the Linux kernel and other modules specific to Android which enable instances of the Dalvik Virtual Machine to run as processes in the Linux kernel. [Note, the default procedure can be altered such that different applications (or components of applications, i.e. activities, services, etc.) can run in the same Linux process, but this is only permitted where the different applications/components have been digitally signed by the same (owner/author) entity.]

This security architecture of the Android Operating System provides application isolation and allows Android to enforce inter-application security constraints. Applications must request specific permissions to access device resources such as files, network, directories, and APIs in general (this is done via the well-known AndroidManifest.xml file which needs to be associated with every Android application and is included in each downloadable .apk package for an Android application and which requires the user to grant all of the requested permissions at the time of installing the application onto the Android device). Also, an application cannot access the data and/or source code of another application "living" in a different Linux process (unless the latter provides the corresponding permissions).

Figure 5:
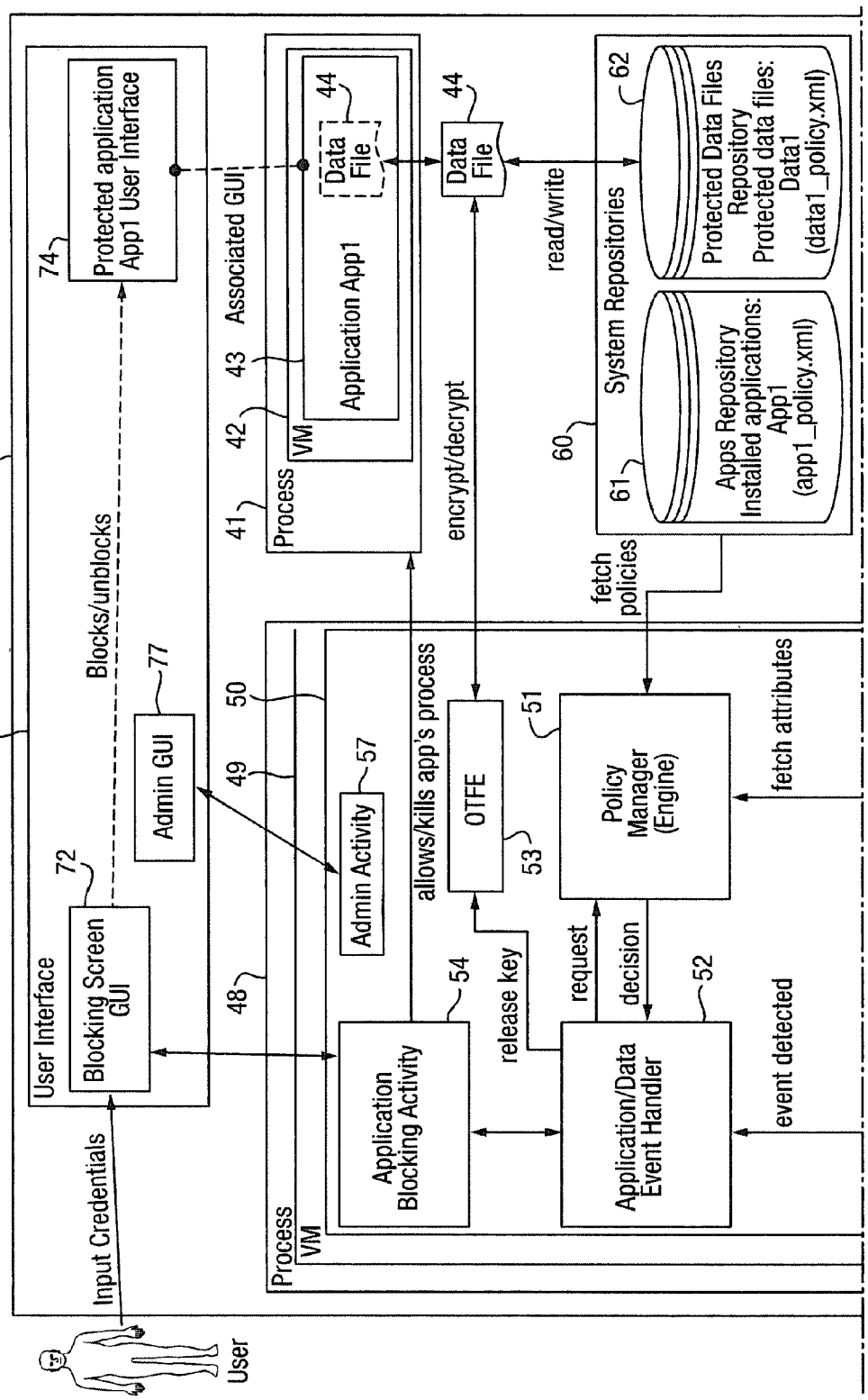
FIG. 5 is a schematic block diagram of the mobile device of FIG. 1 illustrating certain functional aspects of the device in yet greater detail.
Figure 5:
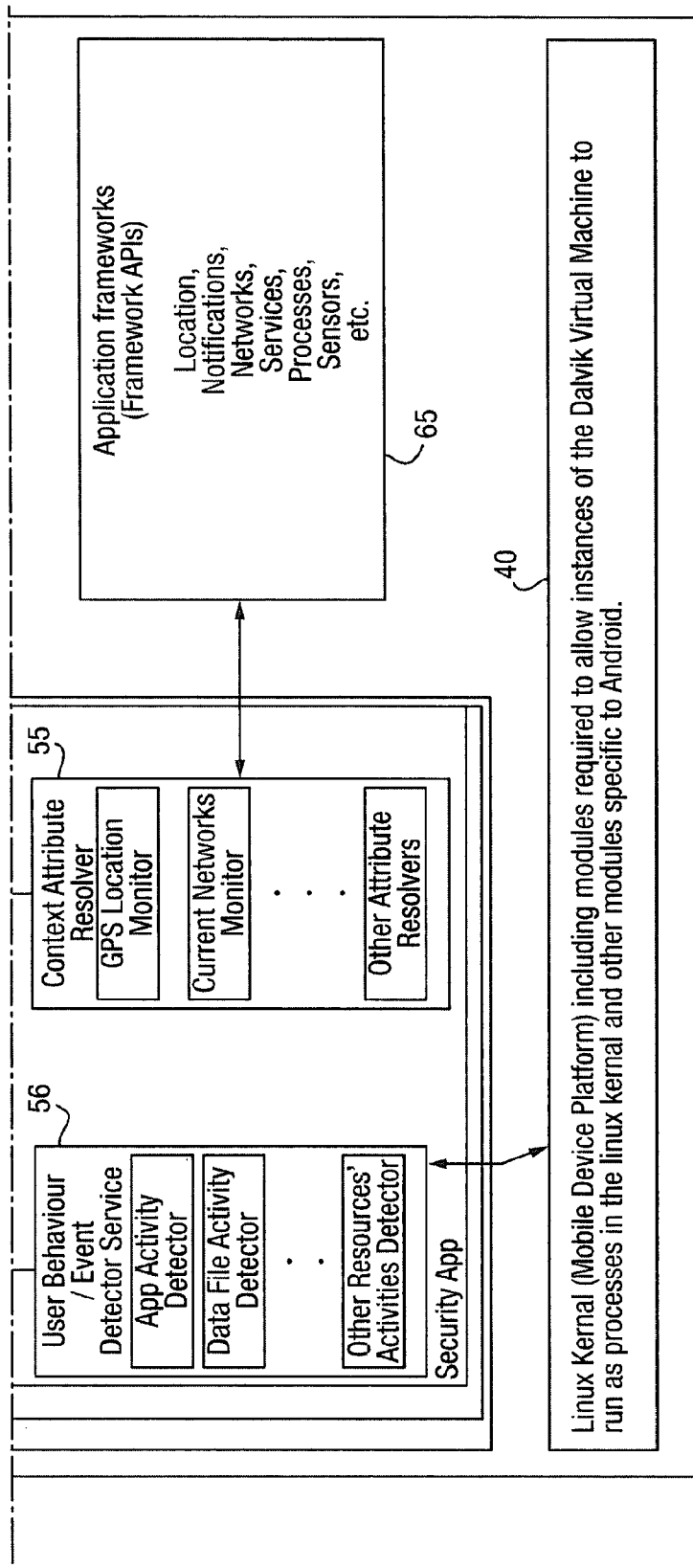

FIG. 5 illustrates an embodiment of a mobile processing device showing details of a "Mobile Security Agent" application 50 which, in the present embodiment, provides (as mentioned above) a policy evaluation module in the form of a Policy Manager (Engine) 51, a dynamic context determination module (the functionality of which is provided in the present embodiment by an Attribute Resolver component 55 and a User Behaviour Service/Event Detector Service 56, the latter of which also provides additional functions as discussed below) and a policy enforcement module (the functionality of which is provided in the present embodiment by an Application Blocking Interface component 54). The Mobile Security Agent 50 is packaged as an Android package (a file having a .apk extension) in the normal manner for an Android app and can be installed in the normal manner for installing Android applications.

In addition to the Mobile Security Agent application 50, FIG. 5 also illustrates that the device includes the Linux kernel and associated Android specific modules component 40 as described above with reference to FIG. 4, a set of Application Framework modules 65 providing a set of applications and associated Application Programming Interfaces which can be used to obtain contextual information from the device including (as illustrated in FIG. 5) information about the device's location, about notifications received by the device, about the network(s) if any to which the device is connected, about the Android services running on the device, about the Linux processes running on the device, and about the readings of any sensors available on the device (e.g. tilt sensors, light sensors, etc.).

FIG. 5 also illustrates a set of system repositories 60, including an Applications Repository 61 and a Protected Data Files Repository 62, providing non-volatile storage of data for the device; and a User Interface 70 (e.g. a touch sensitive screen and speakers and microphone etc: together with driving software for these device's etc.) via which output information can be presented to a user and input information can be received from a user—FIG. 5 also schematically illustrates three particular user interfaces, a blocking screen GUI 72 associated with the Mobile Security Agent 50, an Admin user interface 77 associated with an Admin Activity module 57 forming part of the user behaviour app locker 50 and an App1 user interface 74 associated with a protected application App1 43 which is also illustrated in FIG. 5 as running within a Dalvik Virtual Machine 42 which is itself illustrated as running as a Linux process 41. Finally FIG. 5 illustrates a data file Data1 44 which is obtained from the Protected Data Files Repository 62 and opened by the App1 application after, having been decrypted by the Mobile Security Agent 50 as discussed below.

Protected and Restricted Applications and Security Sticky Policies

In the present embodiment, all authorised applications are either "Protected or Restricted applications" as defined before and so henceforth any reference to an "application" (i.e. without qualifying it as an unauthorised application, or a restricted application or a protected application) can be taken as being either a protected or a restricted application. The reason for wanting all authorised applications to be either protected or restricted is to ensure that legitimate third party applications can be used in a safe manner. The mechanism used in the present embodiment for achieving this to firstly ensure that any application which is already installed on the phone when the Mobile Security Agent is installed is checked when the Mobile Security Agent first runs to see if it is either a protected application (with its own security policy already associated with it) or if it is a known application which appears in a prepopulated white list of known and permitted applications, in which case it is associated with a default restriction security policy to convert it into a restricted application (unless or until the application has a specific restriction policy applied to it). Similarly, any new application installed after the Mobile Security Agent has been installed is checked against the white list of allowed applications at the time of it being installed—only if it appears on this white list is it allowed to be installed and again a restriction security policy is automatically applied (either a specific one for that application or else the default restriction policy) to it to make it a restricted application. It is possible for an administrator to add new applications to the white list of allowed applications for the device using the Admin Activity 57 described in greater detail below. Similarly, it is possible for an administrator to add or amend policies using the Admin Activity 57.

As a final point concerning this white list of allowable applications, it should be noted that it is useful for the white list to include a mechanism for authenticating that application to be installed as a restricted application. In Android this can be done using the fact that all Android applications must be digitally signed by the author of the application. Thus the white list can include details of the author (e.g. the author's public key) to enable the system to verify that an application does originate from the author of the permitted application. Similar mechanisms could be employed in alternative (i.e. non-Android) environments.

When a protected application is installed in the mobile device, its installation package contains an associated security (sticky) policy file (this could either be a separate xml file that travels with the associated application or data file (e.g. as part of a .apk package), or it could be incorporated into a single (probably xml) file having the (encrypted) data or application as a portion of the whole file together with a portion which specifies the policy). FIG. 5 illustrates an example protected application called App1(both as an executable file "App1" stored in an Apps Repository 61 within System Repositories 60 and as a running instance, Application App143, which has an associated sticky policy file, named app1_policy.xml (which is also stored as a file in the Apps Repository 61), which defines security and contextual constraints specifying the conditions under which the application can be launched/used/accessed and by whom.

Also for security reasons, if a policy is sent as a separate file from an external party, it should be signed by that party so that it is verifiable as a legitimate policy from the author of the associated application. Additionally, a restriction policy may be applied even to a protected application (i.e. one which already has its own sticky policy written by the author of the application, since it may originate from an untrusted third party and so the device's administrator may wish to place restrictions on the extent to which applications from third parties (even those which have specified a sticky policy) can use resources on the device by applying its own restrictive policy in addition to the sticky policy provided by the application's author).

There now follows a brief discussion of each of the principal modules of the Mobile Security Agent 50.

Admin Activity Module 57

The admin activity module 57 represents the initial entrance into the Mobile Security Agent application 50 and, in the present embodiment, is started up whenever the user (or an administrator) elects to start the application (e.g. by the user or administrator "clicking" on an icon associated with the Mobile Security Agent 50). The admin activity causes a user interface screen 77 to be presented on the device's screen 70 which initially requests an admin password to be provided by the user (in the present embodiment the application initially has a default admin password but this can be changed from within the admin activity module 57 to an individual—and thus more secure—password). If the correct password is supplied then the user is presented with various options including an option to start up the services (described below) of the Mobile Security Agent and an option to cause these to be started automatically upon booting up the device. In the present embodiment the services are a User Behaviour Service/Event Detector Service 56 and a Context Attribute Resolver 55 (which is also implemented as an Android service).

Via the admin activity module 57, the user also has the option to specify that these services 55, 56 should always be started automatically whenever the device is powered up. This option to automatically start up specified services on powering up the device is readily available to all Android applications, although it requires a permission to be granted from the user at the time of installation of the application (using the well-known Android Manifest a file called AndroidManifest.xml which every Android application must include and which specifies the resources from the device which the application requires). Thus once this automatic startup option has been selected it will not be necessary for the admin activity to be explicitly launched by a user of the device in order for the Mobile Security Agent 50 to operate (at least in order to perform its security functions—clearly to launch the admin screen it will be necessary still to launch the application explicitly since at startup only the background services are initially started automatically in the present embodiment).

As mentioned above, the admin activity also enables the admin password to be changed and for a whitelist of allowable applications to be amended so that new applications can be installed onto the device (other than certain pre-populated allowed applications originally specified on the whitelist). The Admin Activity also, in the present embodiment, provides an option for policies to be added or amended. Note however that a generally more appropriate method of updating policies is to use an update facility which permits a remote administrator to push updates of the Mobile Security application directly to individually specified devices over any suitable interface (e.g. over a wifi connection), as this is as secure a method as using an admin password protected Android activity and is also straightforward to implement and has the convenience of enabling a centrally located administrator to administer a large number of remote devices. In alternative embodiments, it may also be possible for a centrally located security administrator (e.g. an administrator employee of a corporation which supplies the device and installs the mobile security application) to employ the same mechanism of remotely pushing updates to control all settings accessible via the admin activity component so that no physical access to the device is required at all in order to initiate the background services of the application (described below) and set them to automatically launch on booting up the device, for example.

User Behaviour/Event Detector Service 56

This component runs as an android (background) service in its own thread. It obtains the current runtime environment and accesses, reads and monitors the device's logging system in order to detect, for example, when an application is about to be launched. As soon as an application launch is detected this component informs the Application/Data Event Handler component 52.

Application/Data Event Handler 52

When invoked by the User behaviour/Event Detector Service 56 upon detecting that an application is about to be launched, this component checks whether the application being launched contains, or has associated with it, an associated (sticky) policy (or if the application is being launched from a stack which contains a protected application having a policy associated therewith). If it does the User behaviour/Event Detector Service 56 performs the following steps:

1. It requests an Application Blocking Interface component 54 (described below) to block the launch of the application (in the present embodiment, this is achieved by simply killing/terminating the launched application and any subsequent "unblocking" of the application is achieved by simply relaunching the terminated application) and, in the present embodiment, also requests the ID (i.e. username) of the user attempting to launch the application via its own user interface component (e.g. the user is requested to input to the device the user's ID and possibly a form of authentication such as a password). The user interface is controlled by an Application Blocking Interface component 54 discussed in greater detail below. Note that in the present embodiment, a requirement for a user to enter a user ID is automatically performed, however in alternative embodiments, the requirement for a user to perform a user identification or authorisation, etc. is preferably policy controlled—i.e. some applications could require this and some may not. In such a case, an initial policy evaluation request could be made to the Policy Manager component 51 to ascertain whether or not some kind of user identification is required (or the policy could be directly obtained by the Application/Data Event Handler 52 and examined to determine if any kind of interaction with the user via the user interface 70 (and the blocking screen GUI 72 in particular) is required without making a request to the Policy Manager 51). For cases where such a step is required, the blocking interface would then again be launched and the procedure would continue as described below for the present embodiment (in which such identification is always requested when the attempted launch of a protected application is detected).

2. Upon receiving the ID of the user requesting access, the Application/Data Event Handler 52 makes a (further) policy evaluation request to the Policy Manager component 51 including the user ID and the name of the application (to be launched). The Application Launch Handler waits for the evaluation decision. The Policy Manager 51 (described in greater detail below) obtains all relevant sticky policies (which could just be a sticky policy associated with the app being launched (e.g. app1_policy.xml if App1is being launched) if the app is being launched either from a home screen of the Android device 10 or from the Mobile Security Agent application, but if it is being launched by or from another application then any sticky policy associated with that application may also need to be assessed by the Policy Manager 51 (which acts as the claimed policy evaluation module in the present embodiment); what is more, this process could have deeper applications within a stack of such applications which have launched one another (to any depth in theory), all of which may have associated sticky policies which would then be relevant sticky policies requiring consideration by the Policy Manger. In the present embodiment, the Policy Manger itself then obtains from the Apps Repository 61 (located within the system repositories 60) all relevant sticky policies and uses them in order to make its evaluation. One possible stipulation in a policy could, for example, be that only certain pre-specified applications may be allowed to launch if they are being launched within a stack of applications which contains a protected application. For example if App1has been launched and then from within app1 a new permitted non-protected app is launched (e.g. a word processing app) the policy could specify that email is not allowed to be launched when App1is in the stack and thus a normally permitted launch of an email application from the word processing application would not be permitted (this might prevent a user from being able to email content obtained from using the protected App1even if it has "gone through" a non-protected word processing app.

3. Having determined and obtained all relevant policies, the Policy Manger 51 then requests context attributes from the Context Attribute Resolver 55

4. Once the evaluation decision (allow/deny) is returned from the Policy Manager 51, the Application/Data Event Handler 52 requests the Application Blocking Interface 54 to unblock or to continue to block the application which the user is attempting to launch accordingly (as mentioned above, in the present embodiment, "unblocking" comprises re-launching the application that it had previously killed/terminated).

The Application/Data Event Handler 52 is also responsible in the present embodiment for determining whether or not to allow a data file (e.g. Data1) having an associated sticky policy (e.g. data1_policy.xml) to be opened by a running application. In the present embodiment, this process is handled as follows.

All data files which have an associated sticky policy are considered as protected data files and are encrypted. In order for an application to access a protected data file in a decrypted manner, the following procedure is adopted in the present embodiment. If it is detected by a combination of the User behaviour/Event Detector Service 56 and the Application/Data Event Handler that an application has requested the opening of a protected file, the application is closed and then the Application/Data Event Handler 52 passes a policy evaluation request to the Policy Manager 51 requesting it to make an allow/deny decision. If the decision is to deny then the Application Blocking interface component can generate a message to inform the user that access to the file is denied for security reasons (and the message can specify what aspect of a sticky policy caused the deny decision) and then the application can be automatically relaunched into the same state as it was before making the request to open the disallowed data file (i.e. without the requested file having been opened). If, on the other hand, the decision is to allow opening the data file, then the requested data file is accessed by an On-The-Fly Encryption/decryption unit (the OTFE of FIG. 5, which, in the present embodiment as illustrated in FIG. 5 forms part of the Mobile Security Agent 50) and is decrypted; the application requesting that file is then re-launched by the Mobile Security Agent with the, now decrypted, file. If the process happens quickly enough it can appear to the user that the application was not in fact closed and re-launched but rather that the requested file was simply opened. In order to effect the decryption, after having firstly determined that the requested file is a protected file and after the policy manager has given an allow decision to the Application/Data Event Handler 52, the Application/Data Event Handler 52 provides a suitable decryption key (a "release key") to the On-The-Fly Encryption/decryption component and informs it which file to open and decrypt using the key. The OTFE component then decrypts the file and stores it in a known temporary memory location and informs the Application Blocking Interface which then causes the requesting application to be re-launched with the newly decrypted data file. When the data file is later closed the decrypted copy is simply deleted from memory leaving only the original encrypted file in place.

An alternative embodiment might use an on-the-fly encryption/decryption unit forming a wrapper around the secure repositories. This is a relatively common manner in which to deploy on-the-fly encryption/decryption and its implementation will be readily achievable by programmers skilled in the art of the use of on-the-fly encryption/decryption modules. In such a case the OTFE acts as a proxy, proxying queries for access to the protected files. Instead of responding immediately to any request it receives, it can follow a similar process to that described above to obtain an allow or deny decision and then to behave accordingly (e.g. decrypting the relevant file using a key provided by the Application/Data Event handler and then providing it to the requesting application, or otherwise sending an error message instead of the protected file).

It is to be noted that in both of these cases (e.g. the first case where the OTFE module is formed as part of the Mobile Security Agent 50 and the second case where it is a wrapper around the secure repositories) any request to access a protected file will be detected and dealt with accordingly and so applications can be unaware and agnostic to the security process without causing any problems. This is an important advantage as it protects against malware which might try to access data from the secure repositories without politely requesting them from another application (such as the Mobile Security Agent 50 or an equivalent application). Alternative implementations which maintain this property could advantageously be used in different embodiments.

In order to make the policy evaluation and thus provide an allow or deny response, in the present embodiment, the Policy Manger obtains all relevant sticky policies from both the Apps repository and the protected Data Files Repository (basically, in the present embodiment, all relevant sticky policies will include the sticky policy associated with the data file in question (e.g. data1_policy.xml in respect of example protected data file Data1), the sticky policy associated with the app which is attempting to access the data file and any sticky policies associated with any underlying apps in the stack of apps (if any) used to launch that app (which is now trying to open the protected data file)). In alternative embodiments, the Apps repository (or another repository) may additionally hold policies which are specific to a particular combination of an app and a data file and if relevant then naturally any such combination policies will also be obtained and considered by the Policy Manager 51/policy evaluation module when making a deny/allow decision.

Application Blocking Activity 54

The Application Blocking Activity 54 is a module which acts to launch (or allow) and kill (or block) applications and controls the interface to a user of the device in order to present output information to a user and to obtain input information from the user via a blocking screen GUI 72. From a Model-View-Controller architectural perspective, this component acts to some extent as the interface that separates the view layer (Blocking Screen GUI) from the model/controller layers. The Application Blocking Activity 54 of the present embodiment has three main functionalities:

It receives requests from the Application/Data Event Handler 52 to block (kill)/unblock (launch/re-launch) applications. This component achieves this by opening/closing the Blocking Screen GUI on the device's screen.

If requested by the end-user (e.g. by pressing back button) or by the Application/Data Event Handler 52 (deny launch), the Application Blocking Interface can also simply kill the process that hosts the application being launched.

It obtains the end-user's credentials, via the Blocking Screen GUI 72, and executes identification/authentication tasks as mentioned above. When a user is satisfactorily identified and authenticated, the Application Blocking Interface 54 sends the end-user ID (together possibly with other authentication information if relevant) back to the Application/Data Event Handler 52.

As mentioned above, the Blocking screen GUI 72 illustrated in FIG. 5 is the user interface itself (window, widget, etc.) displayed on the device's screen. Its main functionality is to block protected applications (at view level) from being displayed on the device's screen (in the present embodiment it is run after (temporarily) killing the requested application until a decision as to whether or not to allow the requested application has been made. However, in alternative embodiments this GUI could simply be launched "over the top of" the requested application. In many Android systems only a single GUI is generally visible on the device's screen at any one time (the top interface providing component in the active stack—i.e. there are no windows, when an application has "focus" its GUI takes over the whole of the screen) and so automatically launching this GUI 72 can be enough to satisfy the requirement of preventing the user having access to an application until a decision to allow the application has been made. The Blocking Screen GUI 72 in the present embodiment provides a conventional login form for the end-user to enter username and credentials to be sent via the Application Blocking Activity 54 and the Application/Data Event handler 52 to the Policy Manager 51 for authentication purposes.

Policy Manager 51

As mentioned above, the Policy Manager 51 processes policy evaluation requests from the Application/Data Event Handler 52 and returns an evaluation decision (allow/deny). It may additionally return a "release" key (i.e. a decryption key, for subsequent use by the OTFE 53) if appropriate, in some embodiments. The Policy Manager 51 performs the following steps:

1. Retrieves the applicable sticky policies (e.g. App1_policy.xml) from the system repositories 60. These may be stored as part of the Android installation package files (e.g. archive files having the extension .apk which are generated by an Android Java compiler forming part of the Android Software Development Kit (SDK)) of the application to be launched. The installation package is stored in the System Repository.
2. Parses the policy file.
3. Requests the required attributes for policy evaluation from the Context Attribute Resolver 55.
4. Evaluates the policies
5. Returns the evaluation decision (allow/deny) to the Application/Data Event Handler.

Context Attribute Resolver 55

The Context Attribute Resolver 55 resolves attributes requested by the Policy Manager 51. The Attribute Resolver provides the interfaces needed to communicate with the Application Frameworks APIs 65. This component consists of different subcomponents dedicated to obtain specific attribute values. Depending on the attribute(s) requested each subcomponent has a specific functionality. For instance, the subcomponent GPS Location Monitor provides an interface to communicate with the Location APIs provided by the system to access the GPS receiver. In addition, in the present embodiment, the Context Attribute Resolver 55 additional operates a publish subscribe methodology whereby the Policy Manager 51 can subscribe as a listener for notifications concerning any attributes which are currently relevant to an active application (i.e. one which has been launched and not yet killed) or an active protected data file (i.e. one which has been decrypted and a copy of the decrypted file is still being stored in memory somewhere on the device for use by an application running on the device, even if that application is not itself a protected application). The Context Attribute Resolver will then regularly check the status of each subscribed to attribute and will notify the Policy Manager 51 if a change in the attribute is detected. It may perform this checking by itself subscribing as a listener to one of the Application Framework API's where they have this facility, otherwise it will simply schedule regular pollings of the relevant API. If an application is killed or some other change occurs which changes the attributes that are relevant (to the Policy Manager 51) at any point in time, then the Policy Manager 51 can update the attributes to which it is subscribed as a listener. The Context Attribute Resolver 55 (which corresponds to the claimed dynamic context determination module) naturally needs to regularly update only those attributes which are currently subscribed to by the Policy Manager 51.

A preferred function of the claimed dynamic context determination module and/or the policy evaluator module is to perform conversions between low level context attributes and higher level concepts (e.g. between low level context attributes such as GPS co-ordinates and wifi router SSID's and high level concepts such as "at home" or "at work"). In the present embodiment, these correspond approximately to the context attribute resolver 55 and the Policy Manager 51 however the functionality of converting between low level context attribute values and high level concepts can be located in either of these components or shared between them. In the present embodiment there is a repository for context policies which specify how such conversions should be performed and both the attribute resolver 55 and the policy manager 51 have read access to this repository and can therefore ascertain how to perform these translations. However, only a secure module (such as the policy manager) has write access to this repository such that only an authorised administrator can modify the policies stored in the repository (either via the admin activity 57 or via a push mechanism as discussed above).

Policy Model

The Security Agent 50 (and the policy manager 51 thereof in particular), in the present embodiment, use a policy model as discussed below in order to determine how to evaluate a set of relevant policies in any given situation. Disregarding, for the purposes of the policy model discussion below, context evaluation policies (i.e. policies specifying things such as how to determine if a device is "at work"), the policy model considers that there are four kinds of policies each of which is associated with either a data file or an application. There are two types of policies associated with data files, a data use type of policy and an override type of policy. A data use type of policy specifies in general how a file can be used (e.g. it might specify that a data file can only be accessed when the device is "at work"). An override type of policy specifies a particular application (or a group or a class of applications) which can override a general use type policy.

There are also two types of policies associated with applications which are pertinent to the present discussion of the policy model, a general "app use" type of policy and an "app on data" type of policy (there is also a third type of policy associated with applications called Security Agent permissions which is not relevant to the present discussion of the policy model used in the present embodiment—this third type of application related policy is briefly discussed below). The app use type of policy specifies general conditions under which an application may be used on the device (e.g. not at work during working hours). The "app on data" specifies circumstances under which the application can perform actions that would not normally be permitted for the data file in question (identified individually or by some less direct method—e.g. by belonging to a certain class of data files) where the particular data file in question has an override policy for the application in question.

For example, consider a data file, Data File 1, which is associated with a general data use policy saying that user "Alice" cannot access this data file (Data File 1) at location "Alice_home". HOWEVER, the data file is additionally associated with an override policy permitting an application called "BT App" to override the general data use policy. The BT App is associated with an "app on data" policy saying that user "Alice" can access Data File 1 at location "alice_home" when connected to secure WIFI_BT46. The result of this combination of policies would be that if the device was connected to secure WIFI_BT46 whilst at Alice's home, BT_App would be able to access Data File 1 on Alice's behalf despite the general data use policy seemingly preventing this.

In general, according to the above described policy model, the Security Mobile Agent application 50 "grants" or "denies" access to protected and restricted applications and data files based on the applicable/relevant policies. "Applicable" or "relevant" policy here means a policy that applies to a particular interaction and/or context. For example, a protected data file may contain two policies:

1. Alice can access data file 1 at home
2. Alice cannot access data file 1 at her office If Alice were at home, then only policy (1) would be evaluated. Policy (2) would not be applicable in this context (home) but only if Alice were at her office.

Applicable policies are evaluated depending on the data files and applications involved in an interaction. For example, if the user attempts to open a protected data file using a restricted application (e.g. the gallery application to view a (protected) image file) then the applicable policies associated with the relevant data file and the relevant restricted application would be evaluated; or if the user attempts to open a non-protected file (e.g. document1.txt) using a protected application (e.g. BT_App) then the applicable policies associated with the relevant protected application would be evaluated.

The table below sets out the various combinations of these four different types of policy that could apply and the resulting evaluations that the policy manager evaluates in each such case.

| Eval. | Data Policy File | | | app_policy.xml | |
|---|---|---|---|---|---|
| Rule ID | Data Policy | Overrides | App Policy | App on Data Policy | Evaluation Rules "eval( )": evaluation function |
| 1 | | | | | GRANT ACCESS |
| 2 | | | ✓ | | "eval(App Policy)" |
| 3 | | | ✓ | ✓ | "eval(App_on_Data Policy)" |
| 4 | | | ✓ | ✓ | "eval(App Policy) EXCEPT eval(App_on_Data Policy)" |
| 5 | ✓ | | | | "eval(Data Policy)" |

-continued

Eval. Data Policy File    app_policy.xml

| Rule ID | Data Policy | Overrides | App Policy | App on Data Policy | Evaluation Rules "eval( )": evaluation function |
|---|---|---|---|---|---|
| 6 | ✓ | | ✓ | | "eval(Data Policy) AND eval(App Policy)" |
| 7 | ✓ | | | ✓ | "eval(Data Policy) AND eval(App_on_Data Policy)" |
| 8 | ✓ | | ✓ | ✓ | "[eval(App Policy) EXCEPT eval(App_on_Data Policy)] AND [eval(Data Policy)]" |
| 9 | ✓ | ✓ | | ✓ | "[eval(Data Policy)] OVERRIDE [eval(App_on_Data Policy)]" |
| 10 | ✓ | ✓ | ✓ | ✓ | "[eval(Data Policy)] OVERRIDE [eval(App Policy) EXCEPT eval(App_on_Data Policy)]" |

Where in the above table a tick (✓) indicates what type of policy is found for evaluation during an interaction and (in the case of data policies) whether it defines an override or not. The evaluation rules use the following evaluation function and operators:

- ✓ "eval( )": it takes as parameter the policy to be evaluated. Returns ALLOW or DENY
- ✓ Operator "AND": it is a standard logical AND operator
- ✓ Operator EXCEPT: it is used in the form eval("pol1") EXCEPT eval("pol2") and it gives priority to the evaluation decision eval("pol2") over eval("pol1") if and only if policy pol2 is an exception to policy pol1.
- ✓ Operator OVERRIDE: it is used in the form eval ("pol1") OVERRIDE eval("pol2") it overrides the evaluation decision eval("pol1") with eval("pol2") if and only if policy pol1grants override privilege to policy pol2.

Note however that in the present embodiment every application is associated with at least a general "app use" policy and so the odd rows in the table above (where there is no tick in the App Policy column) do not apply in the present embodiment. Also note that in general policies for restricted apps and protected apps work in the same way. The distinction between restricted and protected apps is more to show that the security agent app 50 covers two kinds of requirements: a protected app as a digital asset with its sticky policy saying the context in which it can be used; and a restricted app with a policy applied by the security agent app restricting its use. But in the end policies once assigned to a (protected or restricted) app are treated in the same way in the present embodiment by the security agent 50.

It should be noted that using a policy model such as the one described above in which different policies are associated with different applications and data files permits relatively simple policies to be specified, but their interaction can result in quite sophisticated behaviour which would be difficult and complex to express in a single overarching policy associated with a single device. What is more, by associating the policies with their respective application or data file (or user or device, etc.) only those policies which are actually pertinent need be stored on the device and thus the approach is more efficient than if one attempted to cover in a single lengthy policy all possible circumstances or eventualities which should be covered by the policy to take into account all situations that might need to be controlled in accordance with a policy. For example, as a matter of policy a corporation might wish to prevent an employee from having unfettered access to a sensitive customer database when not at work; however it might be acceptable for an employee (for example a salesperson) to be able to have access to individual records (e.g. to access a particular customer's contact details) even when not at work (e.g. to organise an informal or social event outside of the work environment). Specifying something relatively complex like this becomes straightforward when the functionality is split over several interacting policies each of which is primarily concerned with just a single entity (e.g. an application, or a data file, or a device or a user) or class of entities (e.g. employees of a particular corporation) or a simple combination of such entities (e.g. a particular application when applied to a particular data file) or classes of entities Finally, as mentioned above, there is a third type of policy which is applied to protected apps (a Security Agent permissions type of policy which in the present embodiment is stored in an xml file called pdp_authz.xml). This type of policy is associated with protected apps and specifies what "Security Agent App" (or what class of security agent apps) is allowed to evaluate and enforce its policies. Suppose for example there is a Corp A App which is installed on Device 1. Device 1 has a "Corp A Security Agent app" (meaning a security agent app whose administrator is Corp. A). The pdp_authz policy is a policy in which Corp A App recognizes Corp A Security Agent App as a valid admin (administrator). Now suppose the same Corp A App is installed on Device 2; however, Device 2 does not have a Corp A Security Agent app installed or there is a Security Agent installed whose administrator is not Corp A but another administrator (another third party or company e.g. a Corp B administrator). In this case, the Corp A App does not allow the user to run it, it blocks itself and asks for the correct Security Agent to be installed (or to be turned ON if already installed); this can of course be controlled by the application itself having the necessary functionality to check for an appropriate Security Agent present and installed on the device—alternatively, or rather more preferably in addition, as an extra security measure the protected app could be encrypted and only the correct Security Agent might be allowed to decrypt it, etc. The reason for this is because if there is not a trusted (by the Corp A App) Security Agent installed or actively running then the Corp A App should not be allowed to run as this could violate the Corp A App's security requirements.

Application Frameworks (APIs) 65

As mentioned above, this is part of the Android system with specific API's often being vendor specific to some extent and device specific (since not all devices contain the same hardware). As will be well understood by a person skilled in the art, these API's provide high level APIs to provide access to or to permit interaction with the different resources available in the device's system. For instance in the Android platform, application frameworks include: activity manager, content providers, location manager, resource manager, notification manager, etc.

Discussion of Flowcharts

Figure 6:
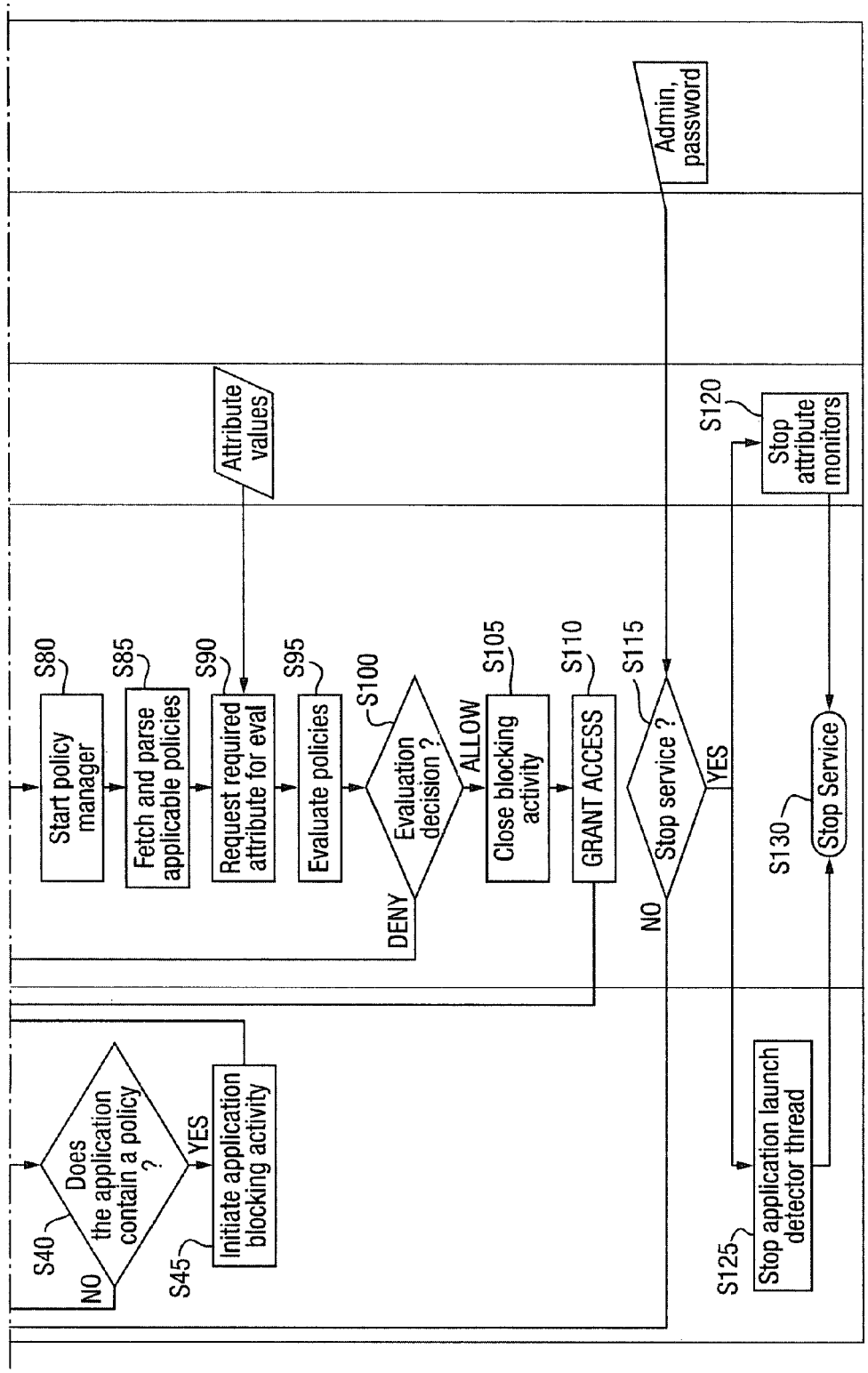
FIG. 6 is a flowchart illustrating the steps performed by the mobile device of FIG. 1 when controlling access to data files based on associated sticky policies.

Turning now to FIG. 6, there is shown a flow chart setting out the steps performed by the device of FIG. 5 when a protected application is launched. As illustrated, the process commences at step S10 in which the Mobile Security Agent 50, and in particular, the admin activity 57 thereof, is launched and, in response to an administrator password being provided by an Administrator (Admin) of the system (which could for example be the end user herself or it could be a system administrator of a company/corporation if the device is a corporate device), via the Admin Activity UI 77, the process proceeds to steps S15, S20 and S25.

In step S15 the Attribute Resolver Service is initiated and will respond to any requests it receives form the Policy Manager 51 (see step S90 below). In step S20 the Admin Activity continues to run and allows the administrator to adjust any settings etc. until the administrator/user decides to close down the admin activity 57 (which will not of course affect the continued running of the various background services including the attribute resolver launched at step S15 and the user behaviour/event detector service launched at step S25 and any further services launched by either of these two services). At step S25 the User Behaviour/Event Detector service 56 is initiated. Having initiated the User Behaviour/Event Detector service 56 at step S25, the method proceeds to step S30.

In step S30 a decision is made as to whether or not the User Behaviour/Event Detector service 56 has detected an attempt by a user of the device to launch an application. If not the process continuously loops back to step S30 until such a detection is made. Once a detection is made the process proceeds to step S35 in which the Application/Data Event Handler 52 is initiated and passed details of the detected attempt to launch an application and then the process proceeds to step S40.

In step S40 the Application/Data Event handler 52 determines if the application whose attempted launch has been detected has an associated policy. Note that in the present embodiment as mentioned above all applications should have at least a restrictive policy associated with them so this step should be redundant in the present embodiment, however it might be useful in alternative embodiments in which applications without any policy are permitted. In such a case, the process simply loops back to step S30 to await the detection of the attempted launch of another application. (also note that in as an alternative in embodiments where all applications are required to have at least a default restrictive policy associate with them, a detection of the attempted launch of an application with no policy associated with it could simply result in the application being blocked—i.e. instantly terminated—since the application would clearly be an unauthorised application and might well be malicious or otherwise potentially harmful to the device or the security of data stored thereon).

If at step S40 it is determined that the application whose attempted launch has been detected does have an associated policy, then the process proceeds to step S45 in which the Application/Data Event Handler 52 causes the Application Blocking Activity 54 to be launched with the identity of the application whose attempted launch has been detected and then the process proceeds to step S50 in which the Application Blocking activity 54 is launched (in a new Main Execution Thread also referred to as a user interface thread) and a user interface associated with the Application Blocking Activity 54, the Blocking Screen GUI 74, is displayed on the screen of the device. Additionally in this step in the present embodiment, the application whose attempted launch was detected is now terminated (this is how the blocking of the application is performed in the present embodiment). The process then proceeds to step S55 in which the Application Blocking activity requests (via the Blocking GUI 72) user identification and authentication. Note that in alternative embodiments this step might be optional—for example it might only apply to protected rather than say restricted applications. Having requested these details, the process then proceeds to step S60 where it is determined whether or not the launch of the application whose attempted launch was detected is to be cancelled (e.g. by the user specifying that the application launch should be cancelled perhaps by hitting the back button on the device or by some other user interface mechanism provided by the Blocking GUI as an alternative to entering the user identification and authentication info). If the launch is to be cancelled the process proceeds to step S65 in which a notification is provided to the user via the blocking GUI 77 that the launch of the requested application has been blocked (and possibly giving an explanation of why this has been done) and the application itself is killed, if this has not already been done (note that in the present embodiment in which blocking is achieved by killing the application, no further action to kill the application actually needs to be done at this step, however, for alternative embodiments in which an alternative form of blocking of the application whose attempted launch was detected is used action should be taken at this step to kill the application). The process then proceeds to step S70 in which the blocking GUI is removed from the device screen (once the user has had an opportunity to review the blocking message) and the Application Blocking activity 54 is closed and then the process is looped back to step S30 where detection of a new attempt to launch an application is awaited.

If at step S60 it is not detected that the launch has been cancelled, then the process proceeds to step S75 in which it is determined whether or not the user has been successfully identified and authenticated (e.g. by the application blocking activity 54 itself, or by the Application/Data event handler 52 or by the policy manager 51 or by some combination of these modules). If not, the process loops back to step S55 to await either successful identification and authorisation of the user or cancellation of the launch of the protected or restricted application. If however step S75 determines that the user has been successfully identified and authenticated, then the process proceeds to step S80 in which the policy manager 51 is initiated by the Application/Data Event handler 52 (if this has not already been done in step S75) and is passed details of the application to be launched and (if it has not already been passed this at step S75) details of the identified and authorised user. (note that in the present embodiment the Policy Manager runs in the same main execution/interface thread as the Application Blocking activity which deliberately holds up the user interface to the device, however alternative embodiments could operate differently in this respect and run the Policy Manager as a service running in its own separate thread of execution) The process then proceeds to step S85.

At step S85 the Policy Manager 51 fetches all relevant policies as discussed above and then the process proceeds to step S90.

In step S90 the Policy Manger 51 assesses what context attributes it requires in order to evaluate the relevant policies which it has obtained and then requests these as necessary from the attribute resolver service 55. The process then proceeds to step S95.

In step S95 the Policy Manger 51 evaluates the relevant policies in the manner described above and generates an allow or deny evaluation decision. The process then proceeds to step S100 in which it is determined whether an allow decision or a deny decision was generated. If a deny decision was issued then the process loops back to step S65, otherwise the process proceeds to step S105 in which the Blocking GUI is removed, and the Blocking Activity 54 is closed and then the process proceeds to step S110 in which the application whose attempted launch was detected is granted access. In the present embodiment, this is achieved by not in fact closing the Blocking activity in the preceding step, but rather first having it instruct the launch of the protected or restricted application whose attempted launch was originally detected in step S30 and only then closing the Application Blocking Activity 54. Note that this launch is not of course detected at step S30 as a new attempted launch because it is determined that the launch has been requested by the Application Blocking Activity rather than by the user or via another application and as such it is automatically allowed without triggering step S30.

Finally, having granted access to the protected or restricted application the process then returns to step S30 to await detection of a further attempt to launch an application.

In order to close the service, the admin activity can be used. Thus if the admin activity is restarted at any time (and assuming the correct admin password is provided) then at step S115 the admin activity 57 determines if a request to stop the service has been received. If not, then the process returns to step S30 to await detection of an attempt to launch an application otherwise if it is detected at step S115 that a request has been made to stop the security agent, then at steps S120 and S125 the attribute resolver service 55 and the user behaviour/event detector service 56 are stopped and then the admin activity 57 is stopped at step S130 marking the end of the process.

Figure 7:
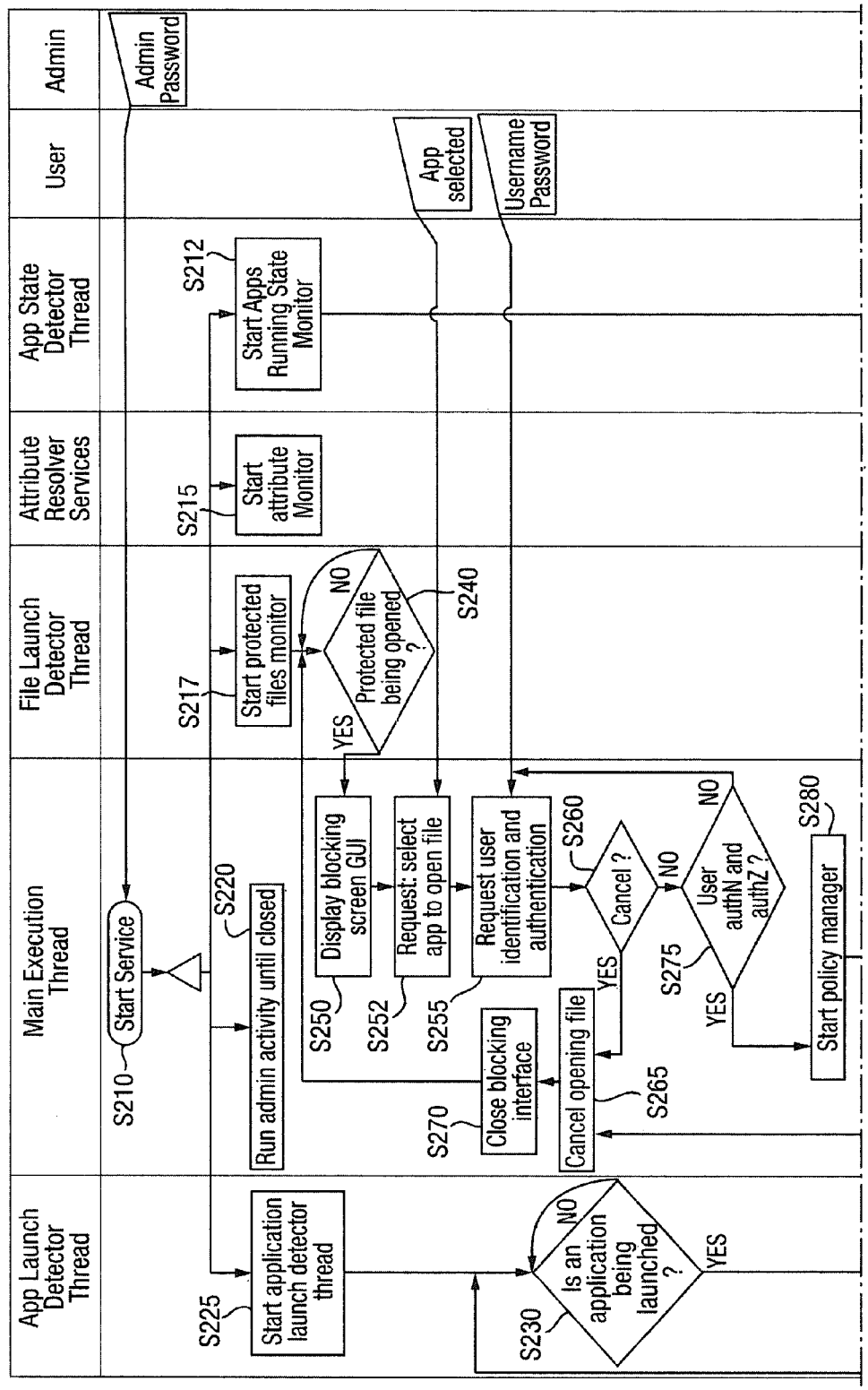
FIG. 7 is a flowchart illustrating the steps performed by the mobile device of FIG. 1 when controlling access to data and application files based on associated sticky policies.
Figure 7:
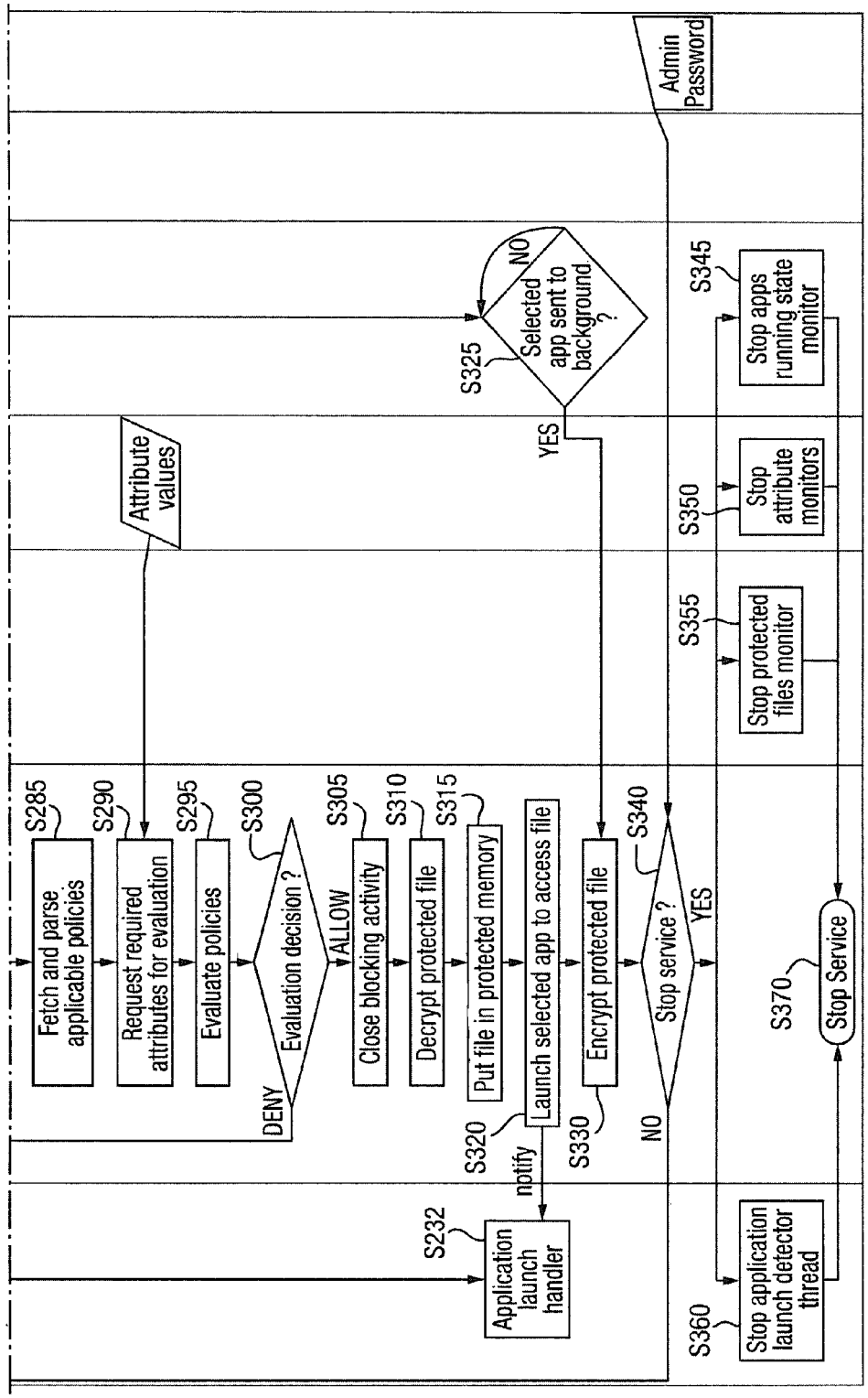

FIG. 7 is an extension of the above described process illustrated in FIG. 6 (which deals just with the launching of applications) showing how the detection of an attempt to open a protected data file is handled in the present embodiment.

Thus, at step S210 the security agent is started again by starting the admin activity 57 which involves the admin GUI 77 starting and requesting the admin password to be entered. If this is successfully entered the various background services associated with the security agent are started including, at step S212 an Apps running state Monitor forming part of the user behaviour/event detector service 56, at step S215 the context attribute resolver service 55, at step S217 a protected files monitor forming part of the user behaviour/event detector service 56, at step S220 the admin activity 57 continues to run permitting options to be set, etc. as described above, until this is closed, and at step S225 an application launch detector within the user behaviour/Event Detector service 56 is also started.

Upon completion of step S225 the process proceeds to step S230 in which it is determined whether the application launch detector of the user behaviour/event detector service has detected that an application has been (attempted to be) launched; if not, the process loops back to this step S230 until such an attempt is detected. When an attempt is detected the process proceeds to an application launch handler sub-routine S232 which basically behaves in the manner described above with reference to FIG. 6.

Upon completion of step S217 in which a protected files monitor within the user behaviour/event detector service 56 is started, the process proceeds to step S240 in which it is determined if the protected files monitor has detected an attempt to open a protected data file. If not the process continuously loops back to step S240 until such a detection is made whereupon the process proceeds to step S250 in which the Application Blocking Activity 54 is started up together with its associated blocking screen GUI 72.

Upon completion of step S250 the process proceeds to an optional step S252 in which a request is made to the user to select which application to use to open the file if more than one application is installed which can open the desired file (this is a normal feature of the Android operating system where more than one application is able to handle a specified "intent" which is the Android mechanism for having different applications perform a desired function, including opening data files). Once either the user has selected which of multiple applications to use to open the data file (if appropriate) or otherwise upon having determined the appropriate application to use to open the file (if there is only one currently installed on the device) the process proceeds to following step S255 in which the Blocking screen GUI 72 requests user identification and authentication in the same manner as described above with reference to step S55. Similarly, this is then followed by steps S260, S265, S270 and S275 which proceed analogously to corresponding steps S60, S65, S70 and S75 respectively except that at this stage no application has yet been launched with which to open the file and so there is no need for any application to yet be killed. Accordingly, at step S265 if the opening of the file has been cancelled a message is provided to the user explaining why the file cannot be openend and then no further action is taken before passing control to step S270 in which the blocking activity 54 and associated GUI 72 are closed before looping the process back to step S240 to await detection of another attempt to open a protected file.

Note that if at step S275 (corresponding to earlier described step S75) it is determined that the user has not been correctly identified the process loops back to step S255 (analogously to the process looping back from S75 to S55 in such a case); whereas if the user is correctly identified the process proceeds to the next step S280 from S275. In step S280 the Policy manager is started (if it has not already been started at step S275—see step S75) and is asked by the Application/Data Event handler 52 to make a policy evaluation in the manner previously described with reference to step S80. The process then proceeds in an analogous manner to before through steps S285, S290 and S295 to step S300 (in the same way as described above with reference to steps S85, S90 and S95 to step S100) whereupon it is determined if the evaluation from the policy manager is to deny or prevent the data file from being opened in which case the process steps back to step S265 discussed above or if the determination is to allow the data file to be opened in which case the process proceeds to step S305.

At step S305 the blocking activity 54 is closed together with its associated blocking GUI 72 and then the process proceeds to step S310 in which the protected file is decrypted (by the OTFE module 53 using a suitable key provided to it by the Application/Data Event handler 52 (previously obtained from the Policy Manger 51 which in the present embodiment keeps such keys securely stored in a secure database of such keys to which only it has access and which may have been obtained in advance or as needed by the Policy Manager from a secure authorised server responsible for controlling access to the protected files, or in some alternative secure manner—note in the present embodiment the policy manager only releases such a key once it has made an allow evaluation in respect of the respective data file being opened). Upon completion of the decryption of the protected data file, the process proceeds to step S315 in which the decrypted protected file is stored in a protected memory, (by which is meant that other processes operating on the device—e.g. associated with other applications, activities, services, etc—cannot access the contents of the memory unless the controlling process permits it, which it does not in the present embodiment—note memory protection is a well-known feature of most modern operating systems) such that only the selected application can access the decrypted file.

Upon completion of step S315 the process proceeds to step S320 in which the selected application (as per selected in step S252 above) is launched (possibly by the blocking activity 54 in which case this is not in fact closed down at step S305, and instead only the blocking GUI is removed from the screen at step S305 and the blocking activity itself is only closed once it has initiated the launch of the selected application with which to open the protected file at step S320).

Upon completion of step S320 the process will then proceed to step S232 since step S30 (of FIG. 6) within the application launch handler subroutine 232 will detect that an application is being launched. Since the policy manager has already evaluated and reached an allow decision any further requests could either be avoided or should also result in an allow decision (unless of course a context attribute has changed in the meantime which is unlikely). Note that although not explicitly illustrated in FIG. 7, it should be noted that the protected files monitor is always looking out for new requests to open a protected file even if it arrives when an earlier request is still being processed. If necessary, separate evaluations can carry on in parallel using different execution threads within the Linux kernel to avoid a problem with one request blocking an allowable request which might otherwise have been straightforward and quick for the device to process.

Step S325 indicates that at any time if a selected application which is using (or displaying) a protected data file is at any time sent to the background (either explicitly by the user or by the action of another service running on the device, etc.) or if the protected data file is closed (e.g. by the user selecting a close file option) or if the entire selected application is closed, then the process proceeds to step S330 in which, in the present embodiment, the protected file is encrypted in its current form (assuming it may have been amended by the user whilst it has been open in the selected application) to ensure that it is not easily accessed by rogue or malicious alternative applications which are not authorised to access the protected data file and the newly encrypted file is stored (either in addition to the original version of the file—perhaps under a new file name—or in place of the original encrypted data file). As an alternative to encrypting the protected data file and then overwriting the original encrypted file, in cases where no changes have been made to the original file whilst opened by the selected application, in some embodiments, the decrypted copy of the file could simply be deleted (and/or over-written for security reasons) leaving just the original encrypted version of the file in storage, thus requiring that the original encrypted copy of the file will need to be again decrypted in order to obtain legitimate reaccess to the file by the allowed application (assuming the context still permits this).

Step S340 is analogous to previously described step S115 and merely provides a mechanism for the security agent to be closed down if so desired by an administrator. The only notable difference is that more subsequent steps (S345, S350, S355 and S360) are required to stop the larger number of background services running before the security agent can itself be completely stopped at step S370 by stopping the Admin activity 57 itself which marks the initial entry point and final exit point to the security agent application.

The invention claimed is:

1. A method of operating a mobile user device which includes a security policy evaluation module, a dynamic context determination module and a security policy enforcement module and which is operable to run an application which is capable of opening a user data file stored in a user data file repository of the mobile user device to permit a user of the mobile user device to view the user data of the user data file, the method comprising:

receiving, at the mobile user device, user data and an associated security policy, the user data and its associated security policy being received either in a single user data file incorporating the associated security policy or separately in a user data file and an associated policy data file; and storing the received user data file in a case in which the user data and its associated security policy are received in the single user data file incorporating the associated security policy or storing the user data file and its associated policy data file in a case in which the user data and its associated security policy are received separately;

in response to receiving a request by a user of the mobile user device for the application to open the stored user data file, the security policy evaluation module accessing the associated security policy;

the dynamic context determination module determining contextual information associated with the current context of operation of the mobile user device and providing the thus determined context information to the security policy evaluation module;

the security policy evaluation module evaluating the accessed associated security policy in dependence upon the received contextual information; and the security policy enforcement module causing the application to open the user data file or to not open the user data file in dependence upon the evaluation;

the method further comprising, in the event that the application was caused to open the stored user data file and while that user data file or application is active on the mobile user device, the dynamic context determination module determining a change in the determined contextual information and sending a notification of a change in the determined contextual information to the security policy evaluation module and the security policy evaluation module evaluating the received associated security policy in dependence upon the changed determined contextual information.

2. A method according to claim 1, further comprising receiving at the mobile user device an executable application file together with an associated application security policy, installing the application onto the mobile user device from the received executable application file and, in response to a user request for the installed application to open the stored user data file, evaluating the received associated application security policy in dependence upon the determined current context of the device and causing the installed application to open the data file or not in dependence upon the evaluation.

3. A non-transitory storage medium carrying processor implementable instructions for carrying out the method according to claim 1.

4. A mobile user device comprising:

memory configured to store:
- a policy evaluation module for evaluating security policies associated with a user data file or an application,
- a dynamic context determination module for determining contextual information associated with the current context of operation of the mobile user device and for providing the thus determined contextual information to the policy evaluation module,
- a policy enforcement module for enforcing the evaluation specified by the policy evaluation module,
- user data files in a user data file repository, and
- application files in association with respective security policies in an application file repository; and processing circuitry configured to
- receive, at the mobile user device, user data and applications, each with a respective associated security policy, each of the user data and applications and its respective associated security policy being received either: (a) in a single user data file incorporating a respective associated security policy or in a single application file incorporating a respective associated security policy, or (b) separately in a user data file and its respective associated security policy or separately in an application file and its associated security policy,
- store, in the appropriate repository, the received user data file and its associated security policy or the received application file and its associated security policy in case (a) in which in the single user data file incorporates a respective associated security policy or the single application file incorporates a respective associated security policy; or store the received user data file and its associated security policy or the received application file and its associated security policy in case (b) in which the user data file and its respective associated security policy are received separately or the application file and its associated security policy are received separately; and
- cause the policy evaluation module to evaluate the security policy associated with the stored user data file or application whenever the associated stored user data file or application is invoked by a user of the mobile user device and, additionally, while the associated user data file or application is active on the device and a notification of a change in the determined contextual information is received by the policy evaluation module.

5. A mobile user device according to claim 4, wherein the mobile user device is operable to store one or more context evaluation policies which are not associated with a particular item of data or application but rather are associated with a particular user of the device or to the device itself.

6. A mobile user device according to claim 4, wherein the device is operable to allow an application to run, or to prevent an application from running on the device or to allow an application to open a data file, or to prevent an application from opening a data file in dependence upon the evaluation of the policy evaluation module.

7. A mobile user device according to claim 4, including an encryption and decryption unit, wherein the encryption and decryption unit is operable to decrypt a data file stored, when the device is in use, on the device in an encrypted manner, and having an associated security policy, only if the policy evaluation device evaluates that an application is allowed to open the stored encrypted data file, the evaluation being performed in dependence upon the security policy associated with the stored encrypted data file.

8. A mobile user device according to claim 4, wherein the device is operable to cause a particular installed application to open a particular stored data file only after performing an evaluation of both a security policy associated with the installed application and a security policy associated with the stored data file, and only in the event that the evaluation of both security policies is that such an action, for the installed application to open the stored data file, is permissible in view of the conditions specified in both evaluated policies.

* * * * *